US008514389B2

(12) United States Patent
Aoki

(10) Patent No.: US 8,514,389 B2
(45) Date of Patent: Aug. 20, 2013

(54) INSPECTING APPARATUS, THREE-DIMENSIONAL PROFILE MEASURING APPARATUS, AND MANUFACTURING METHOD OF STRUCTURE

(75) Inventor: Hiroshi Aoki, Yokohama (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 13/483,437

(22) Filed: May 30, 2012

(65) Prior Publication Data

US 2012/0236318 A1    Sep. 20, 2012

Related U.S. Application Data

(63) Continuation of application No. PCT/JP2010/006774, filed on Nov. 18, 2010.

(30) Foreign Application Priority Data

Nov. 30, 2009 (JP) .................................. 2009-271328
Oct. 27, 2010 (JP) .................................. 2010-241263

(51) Int. Cl.
*G01N 21/00* (2006.01)

(52) U.S. Cl.
USPC ...................................................... 356/237.2

(58) Field of Classification Search
None
See application file for complete search history.

(56) References Cited

U.S. PATENT DOCUMENTS

| 6,654,488 | B1 * | 11/2003 | Behun et al. | 382/144 |
| 6,894,302 | B2 * | 5/2005 | Ishimaru et al. | 250/559.46 |
| 7,349,106 | B2 * | 3/2008 | Slodowski | 356/630 |

FOREIGN PATENT DOCUMENTS

| JP | 2003-279314 | 10/2003 |
| JP | 2005-030812 | 2/2005 |
| JP | 2009-002796 | 1/2009 |
| JP | 2009-150773 | 7/2009 |

OTHER PUBLICATIONS

International Preliminary Report on Patentability from the Japanese Patent Office for International Application No. PCT/JP2010/006774, issued Jun. 5, 2012.
Notification of Transmittal of Translation of the International Preliminary Report on Patentability, issued Jul. 10, 2012 for International Application No. PCT/JP2010/006774.
English-language translation of International Search Report from the Japanese Patent Office for International Application No. PCT/JP2010/006774, mailing date Dec. 21, 2010.

* cited by examiner

*Primary Examiner* — Gregory J Toatley
*Assistant Examiner* — Amanda Merlino
(74) *Attorney, Agent, or Firm* — Finnegan, Henderson, Farabow, Garrett & Dunner, L.L.P.

(57) ABSTRACT

An aspect of an inspecting apparatus includes a profile measuring part measuring a profile of an object surface and an image detecting part detecting a light intensity distribution of the object surface by illuminating the object surface from mutually different plurality of directions.

36 Claims, 15 Drawing Sheets

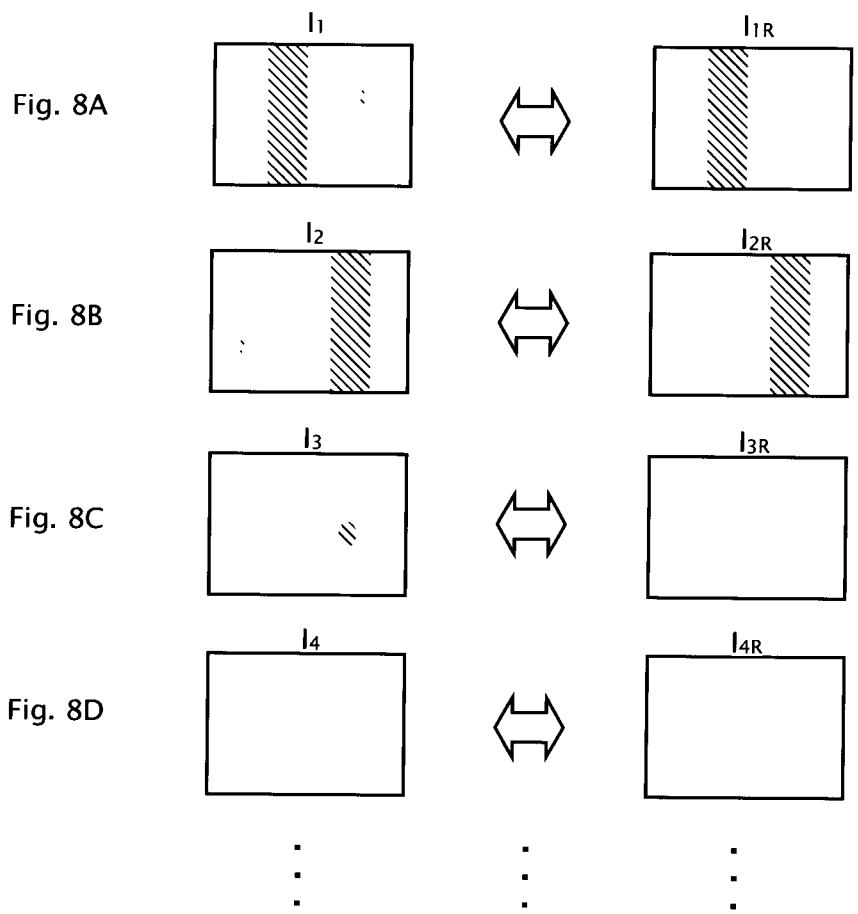
Fig. 8A
Fig. 8B
Fig. 8C
Fig. 8D
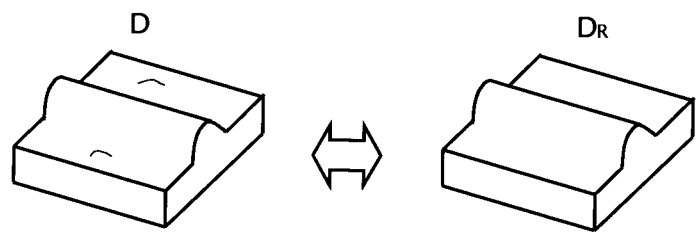
Fig. 9

INSPECTING APPARATUS, THREE-DIMENSIONAL PROFILE MEASURING APPARATUS, AND MANUFACTURING METHOD OF STRUCTURE

CROSS-REFERENCE TO THE RELATED APPLICATIONS

This application is a continuation application of International Application PCT/JP2010/006774, filed Nov. 18, 2010, designating the U.S., and claims the benefit of priority from Japanese Patent Application No. 2009-271328 and Japanese Patent Application No. 2010-241263, filed on Nov. 30, 2009 and Oct. 27, 2010, respectively, the entire contents of which are incorporated herein by reference.

BACKGROUND

1. Field

The present application relates to an inspecting apparatus conducting defect inspection of an object to be measured, a three-dimensional profile measuring apparatus, and a manufacturing method of a structure.

2. Description of the Related Art

There has been conventionally known an apparatus as described in Japanese Unexamined Patent Application Publication No. 2009-150773, as an apparatus of conducting three-dimensional profile measurement of a measuring object.

However, in a three-dimensional profile measuring apparatus, it was sometimes difficult to detect small flaws and holes, due to a restriction in resolution and the like.

The present application has a proposition to provide an inspecting apparatus capable of detecting flaws and holes which were difficult to be found only by a three-dimensional profile measuring apparatus, a three-dimensional profile measuring apparatus, and a manufacturing method of a structure.

SUMMARY

An aspect of an inspecting apparatus exemplifying the present embodiment includes a profile measuring part measuring a profile of an object surface, an image detecting part detecting a light intensity distribution of the object surface by illuminating the object surface from mutually different plurality of directions, and a controlling part conducting non-defective/defective judgment of the object surface by controlling the profile measuring part and the image detecting part.

BRIEF DESCRIPTION OF THE DRAWINGS

FIGS. 8A, 8B, 8C, and 8D are diagrams explaining step S3.

FIG. 9 is a diagram explaining step S8.

DETAILED DESCRIPTION OF THE EMBODIMENTS

[First Embodiment]

Hereinafter, as an apparatus of a first embodiment, an apparatus being a defect inspecting apparatus, which is also a three-dimensional profile measuring apparatus, will be described. The apparatus of the present embodiment is the defect inspecting apparatus when it is used for defect inspection, and is the three-dimensional profile measuring apparatus when the defect inspection is not conducted. Hereinafter, description will be made by setting that the apparatus of the present embodiment is the defect inspecting apparatus, for the sake of simplification, but, the three-dimensional profile measuring apparatus also has the same apparatus configuration.

Figure 1:
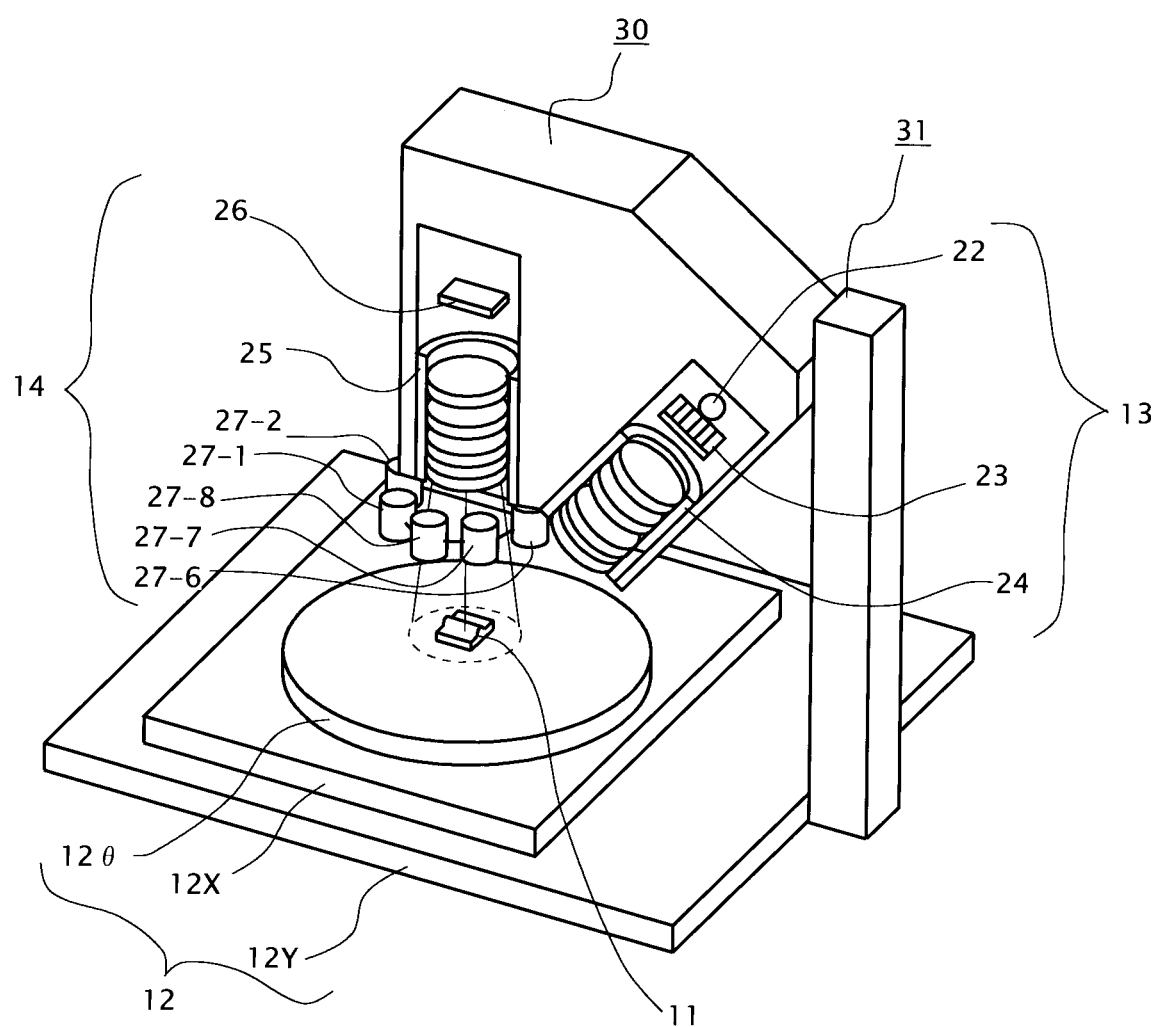
FIG. 1 is a perspective view illustrating a mechanical configuration of a defect inspecting apparatus of a first embodiment.

FIG. 1 is a perspective view illustrating a mechanical configuration of the defect inspecting apparatus of the present embodiment. As illustrated in FIG. 1, the defect inspecting apparatus includes a stage 12 on which an object 11 made of an industrial product or part, for example, is placed, and a projecting part 13 and an imaging part 14 which are mutually fixed. There is provided an angle between an optical axis of the projecting part 13 (an optical axis of a projecting optical system 24) and an optical axis of the imaging part 14 (an optical axis of a later-described image-forming optical system 25), and the optical axes of the both intersect on a reference plane of the stage 12. Out of the above, the optical axis of the imaging part 14 is perpendicular to the reference plane of the stage 12. Note that it is also possible that the optical axis of the projecting part 13 is set to be perpendicular to the reference plane, instead of setting the optical axis of the imaging part 14 to be perpendicular to the reference plane. However, description will be made hereinbelow by citing a case where the optical axis of the imaging part 14 is perpendicular to the reference plane, as an example.

The stage 12 includes a θ stage 12θ that rotates the object 11 around an axis parallel to the optical axis of the imaging part 14, an X stage 12X that makes the object 11 shift toward a predetermined direction (X direction) perpendicular to the optical axis of the imaging part 14, and a Y stage 12Y that makes the object 11 shift toward a predetermined direction (Y direction) perpendicular to both of the rotation axis of the θ stage 12θ and the X direction.

The projecting part 13 is an optical system that illuminates, from a diagonal direction, a part of area (illumination area) on the stage 12, in which an illuminating element 22, a pattern forming part 23, and the projecting optical system 24 are disposed in this order. Note that a size of the object 11 of the present embodiment is supposed to be small enough so that the entire object 11 is fitted within the illumination area of the projecting part 13, but, even if an object with larger size is employed, it is possible to conduct the inspection and measurement while moving the stage 12.

The pattern forming part 23 of the projecting part 13 is a panel whose transmittance or reflectance distribution is variable (a transmission-type liquid crystal element, a reflection-type liquid crystal element, a DMD (Digital Mirror Device) or the like), and by displaying a striped pattern (sinusoidal profile pattern) on the panel, a cross-sectional intensity distribution of luminous flux of illumination from the pattern forming part 23 toward the object is made to have a sinusoidal shape. Note that when the reflection-type panel is used, a position of light source is changed, but, the position can be appropriately changed by a person skilled in the art. In the present embodiment, description will be made by citing a case where the transmission-type panel is used, as an example. A grating direction of the sinusoidal profile pattern displayed on the pattern forming part 23 is set to be perpendicular to a plane that includes the optical axis of the projecting part 13 and the optical axis of the imaging part 14. Further, a reference point positioned in the vicinity of a center on a display surface of the pattern forming part 23 is optically conjugated to a reference point on the reference plane of the stage 12 (a point of intersection between the optical axis of the imaging part 14 and the optical axis of the projecting part 13), and onto a surface of the object 11 (object surface) disposed within the illumination area of the stage 12, the sinusoidal profile pattern is projected by the projecting optical system 24. Note that as long as the sinusoidal profile pattern can be projected onto the object surface, there is no problem if the reference point of the pattern forming part 23 and the reference point of the stage 12 are not in a perfect conjugate relation.

The imaging part 14 is an optical system that detects an image (light intensity distribution) of illumination area on the stage 12, in which the image-forming optical system 25 that forms an image of a pattern projected onto the object surface, on an imaging element 26, and the imaging element 26 that captures the image formed by the image-forming optical system 25 and obtains the image of the projected pattern, are disposed in sequence. A reference point positioned in the vicinity of a center on the imaging plane of the imaging element 26 is optically conjugated to the aforementioned reference point of the stage 12, and the imaging element 26 can obtain an image of the object surface of the object 11 disposed within the illumination area on the stage 12. Note that as long as the image of the object surface with sufficient contrast can be obtained, there is no problem if the reference point of the imaging element 26 and the reference point of the stage 12 are not in a perfect conjugate relation.

Further, there are provided auxiliary light sources 27-1 to 27-8 around a lens on a stage side of the image-forming optical system 25, and these auxiliary light sources 27-1 to 27-8 illuminate a field of view of the image-forming optical system 25 from mutually different directions.

Note that the imaging element 26 has sensitivity with respect to both of emission wavelengths of these auxiliary light sources 27-1 to 27-8 and an emission wavelength of the light source (reference numeral 21 in FIG. 2) of the projecting part 13.

Here, when an image is obtained from the imaging element 26 in a state where at least one of the auxiliary light sources 27-1 to 27-8 is switched on, and the light source (reference numeral 21 in FIG. 2) of the projecting part 13 is switched off, an image of object surface onto which the sinusoidal profile pattern is not projected (which is an image including light intensity distribution information of the object surface) can be obtained. Hereinafter, this image is referred to as "two-dimensional image".

Further, by repeatedly obtaining the two-dimensional images while switching the auxiliary light sources to be switched on among the auxiliary light sources 27-1 to 27-8, it is possible to obtain a plurality of two-dimensional images $I_1$ to $I_8$ with different illuminating directions (hereinafter, a two-dimensional image obtained by switching on only the M-th auxiliary light source 27-M is set to "two-dimensional image $I_M$").

Meanwhile, when an image is obtained from the imaging element 26 in a state where all of the auxiliary light sources 27-1 to 27-8 are switched off, and the light source (reference numeral 21 in FIG. 2) of the projecting part 13 is switched on, an image of object surface onto which the sinusoidal profile pattern is projected (which is an image including profile information of the object surface) can be obtained. Hereinafter, this image is referred to as "striped image".

Further, by repeatedly obtaining the striped images while shifting a phase of the sinusoidal profile pattern, pieces of information with which profile data D of the object surface is made known, are gathered.

Figure 2:
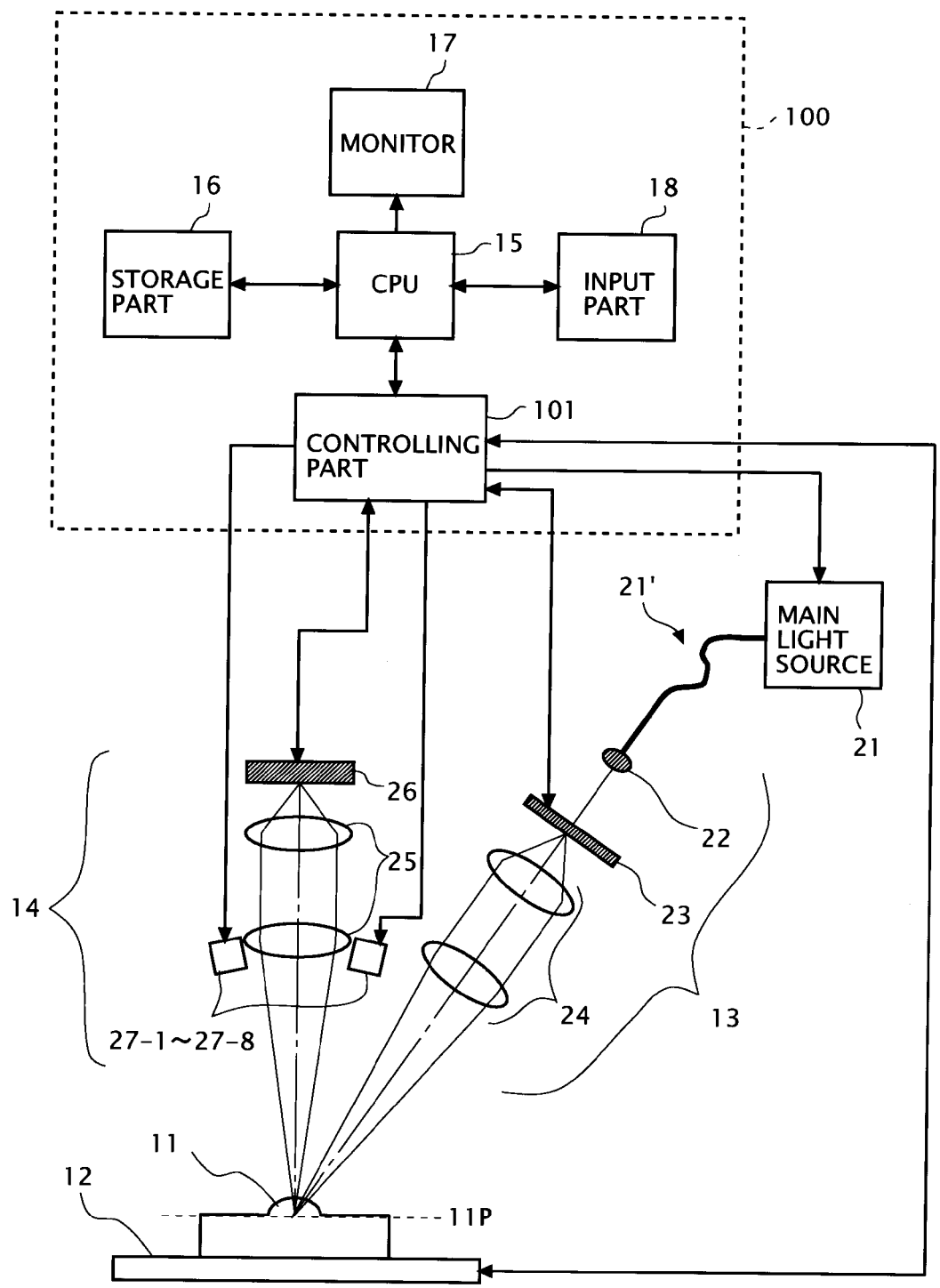
FIG. 2 is an entire configuration diagram of the defect inspecting apparatus of the first embodiment.

FIG. 2 is an entire configuration diagram of the defect inspecting apparatus. In FIG. 2, the same elements as those illustrated in FIG. 1 are denoted by the same reference numerals. As illustrated in FIG. 2, to the projecting part 13, a main light source 21 being a light source of the projecting part 13 is coupled. This main light source 21 is used for pattern projection type profile measurement, so that it can employ a commonly-used light source such as, for example, an LED, a halogen lamp, and a metal halide lamp. Light emitted from the main light source 21 is introduced into the illuminating element 22 via an optical fiber 21'. Note that although an example of using the optical fiber 21' is described here, it is also possible to dispose the light source such as the LED at a position indicated by a reference numeral 22 in FIG. 1, without using the optical fiber. It is possible to dispose an arbitrary illuminating element 22 between the LED and the pattern forming part 23. Further, although the illuminating element 22 is illustrated as one element, it may also be formed of an illuminating optical system made of a plurality of optical elements. In such a case, for example, it is possible to dispose the illuminating optical system using a fly-eye lens, a rod integrator or the like for providing uniform illumination.

This main light source 21, the pattern forming part 23 of the projecting part 13, the imaging element 26 of the imaging part 14, and the auxiliary light sources 27-1 to 27-8 of the imaging part 14 are respectively connected to a controlling part 101 of a computer 100.

The controlling part 101 controls a timing of turning on/off (switching on/off) the main light source 21, the phase of the sinusoidal profile pattern displayed on the pattern forming part 23, a timing of obtaining image using the imaging element 26, and a timing of turning on/off (switching on/off) each of the auxiliary light sources 27-1 to 27-8. Further, the controlling part 101 can also detect coordinates of the stage 12 (stage coordinates), according to need.

The computer 100 includes, in addition to the controlling part 101, a CPU 15 that comprehensively controls the entire defect inspecting apparatus, a storage part 16, a monitor 17, and an input part 18. In the storage part 16, an operation program for the CPU 15 is previously stored, and the CPU 15 operates in accordance with the operation program. For example, the CPU 15 drive-controls the respective parts of the defect inspecting apparatus by giving various instructions to the controlling part 101. Further, for example, the CPU 15 drive-controls the respective parts of the defect inspecting apparatus to conduct non-defective/defective judgment of the object 11 based on the obtained image.

Further, in the storage part 16, various pieces of information necessary for the operation of the CPU 15 are also previously stored, in addition to the aforementioned operation program.

One piece of the information previously stored in the storage part 16 includes non-defective (designed shape) product images $I_{MR}$ (M=1 to 8) whose number is the same as the number of types of two-dimensional images $I_M$ (refer to the right side of FIGS. 8A to 8D). The M-th non-defective product image $I_{MR}$ corresponds to a non-defective product image of the M-th two-dimensional image $I_M$, and is a two-dimensional image obtained by placing, instead of the object 11, a non-defective product with the same specification as that of the object 11, on the stage 12, and switching on, in that sate, only the M-th auxiliary light source 27-M, for example. Note that the non-defective product image $I_{MR}$ can also be formed through calculation based on design data of the object 11 and design data of the defect inspecting apparatus.

Further, one piece of the information previously stored in the storage part 16 includes non-defective profile data $D_R$ (refer to the right side of FIG. 9 to be described later). The non-defective profile data $D_R$ corresponds to non-defective product data of the profile data D, and is profile data obtained in a state where a non-defective product with the same specification as that of the object 11, instead of the object 11, is placed on the stage 12, for example. Note that the non-defective profile data $D_R$ can also be formed through calculation based on the design data of the object 11 and the design data of the defect inspecting apparatus.

Figure 3A:
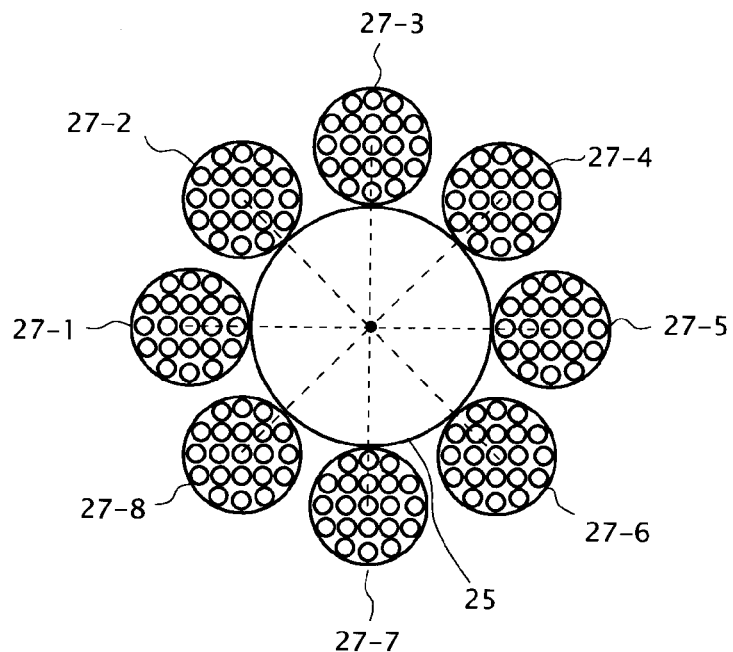
FIGS. 3A, 3B, and 3C are diagrams in which auxiliary light sources 27-1 to 27-8 and an image-forming optical system 25 are seen from a side of a stage 12.

FIG. 3A is a diagram in which the auxiliary light sources 27-1 to 27-8 and the image-forming optical system 25 are seen from a side of the stage 12. As illustrated in FIG. 3A, the auxiliary light sources 27-1 to 27-8 are surface light sources disposed at even intervals around the lens on the stage side of the image-forming optical system 25, and specifications thereof are substantially common to one another.

Figure 4A:
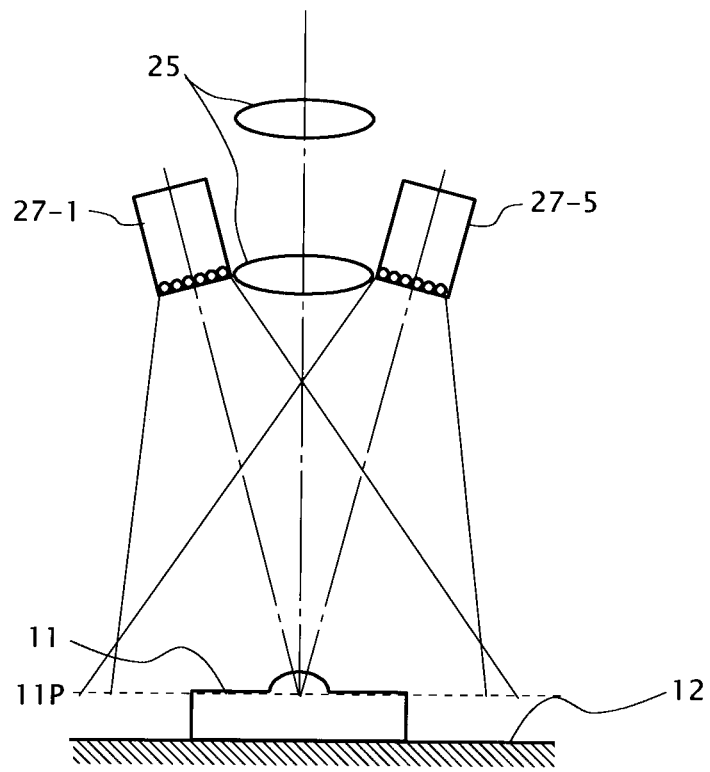
FIGS. 4A and 4B are diagrams explaining a relation among optical axes of the auxiliary light sources 27-1 to 27-8 and an optical axis of the image-forming optical system 25.

An optical axis of each of the auxiliary light sources 27-1 to 27-8 is inclined by a predetermined angle with respect to an optical axis of the image-forming optical system 25, and intersects the optical axis of the image-forming optical system 25 on a reference plane 11P of the stage 12, as illustrated in FIG. 4A. Note that a position of the intersection is substantially the same as a position at which the optical axis of the projecting part 13 and the optical axis of the imaging part 14 intersect.

Further, as illustrated in FIG. 3A, each of the auxiliary light sources 27-1 to 27-8 has a plurality of cannonball-shaped type LEDs two-dimensionally and densely arranged thereon, thereby forming the surface light source. A tip of the cannonball-shaped type LED has a shape which can function as lens, and light emitted from each of the LEDs illuminates a measuring plane. In an illumination area formed on the stage 12 by each of such auxiliary light sources 27-1 to 27-8, illuminance becomes substantially uniform.

Note that since FIG. 3A is a schematic diagram, the number of LEDs arranged on each of the auxiliary light sources 27-1 to 27-8 is not always the same number as that illustrated in FIG. 3A. However, as the number becomes larger, it is possible to broaden the area with high illuminance uniformity.

Figure 3B:
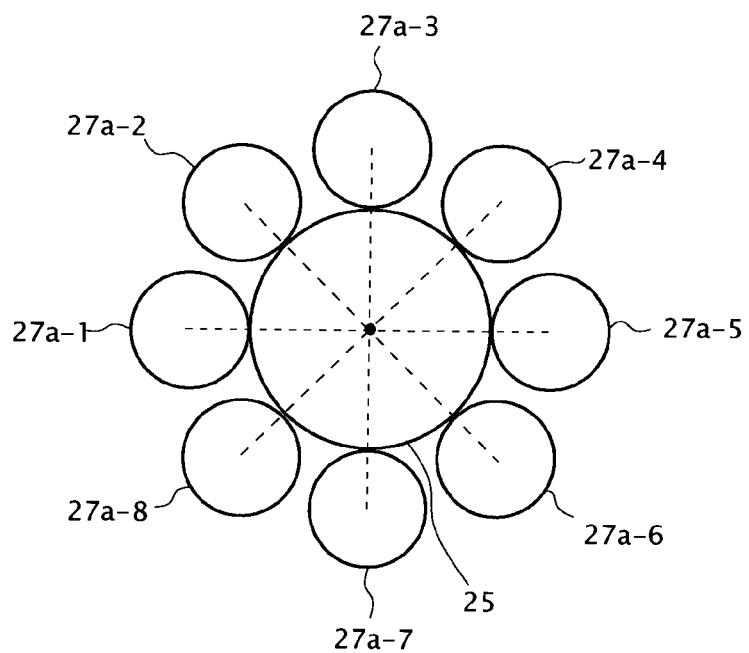

Note that it is possible to employ a configuration such that eight auxiliary light sources 27a-1 to 27a-8 are disposed around the image-forming optical system 25, as illustrated in FIG. 3B, instead of densely disposing the plurality of LEDs. As the light sources, various types of light sources, other than the LEDs, can be used.

Figure 3C:
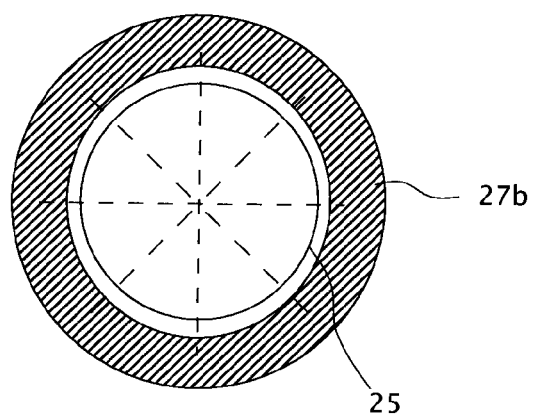

Further, it is also possible to employ a configuration in which one circular ring-shaped auxiliary light source 27b is disposed, as illustrated in FIG. 3C, although the switching of the plurality of light sources cannot be made. In this case, although one light source is used, it is possible to illuminate the object surface from a plurality of directions at the same time.

Further, although not illustrated, it is also possible to employ a configuration in which a beam splitter is used to perform epi-illumination. In the present embodiment, the number of the plurality of light sources is set to 8, but, it is also possible to dispose the light sources whose number is smaller or larger than 8.

Figure 4B:
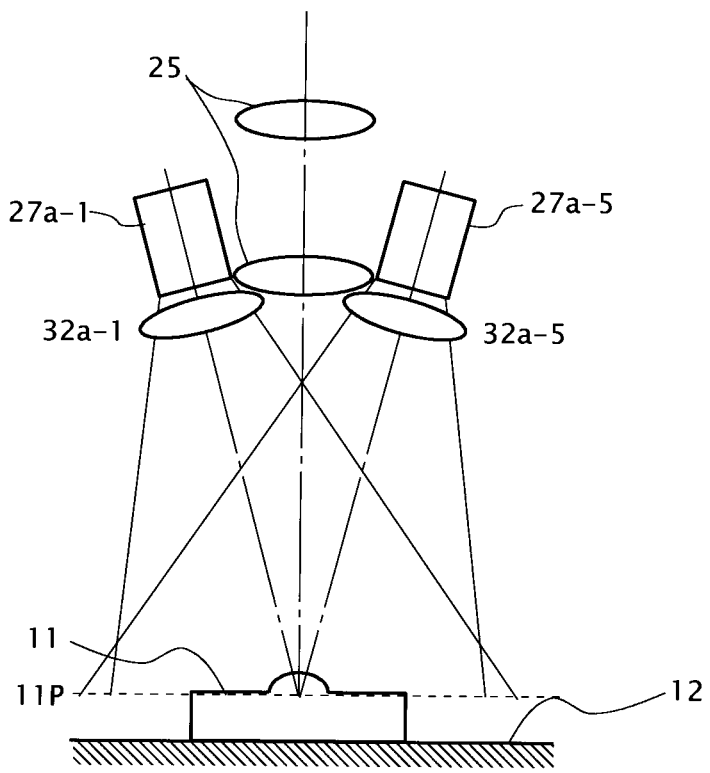

Further, it is also possible to employ a configuration in which an illuminating optical system 32 is separately disposed between the auxiliary light source 27 and the object surface 11, as illustrated in FIG. 4B. In this case, it is possible to use, not the cannonball-type LED, but another LED as the auxiliary light source 27.

Further, each of the auxiliary light sources 27-1 to 27-8 is used for the light intensity distribution measurement (obtainment of two-dimensional image), so that it is possible to apply a white LED or the like, for example, as each LED.

Figure 5:
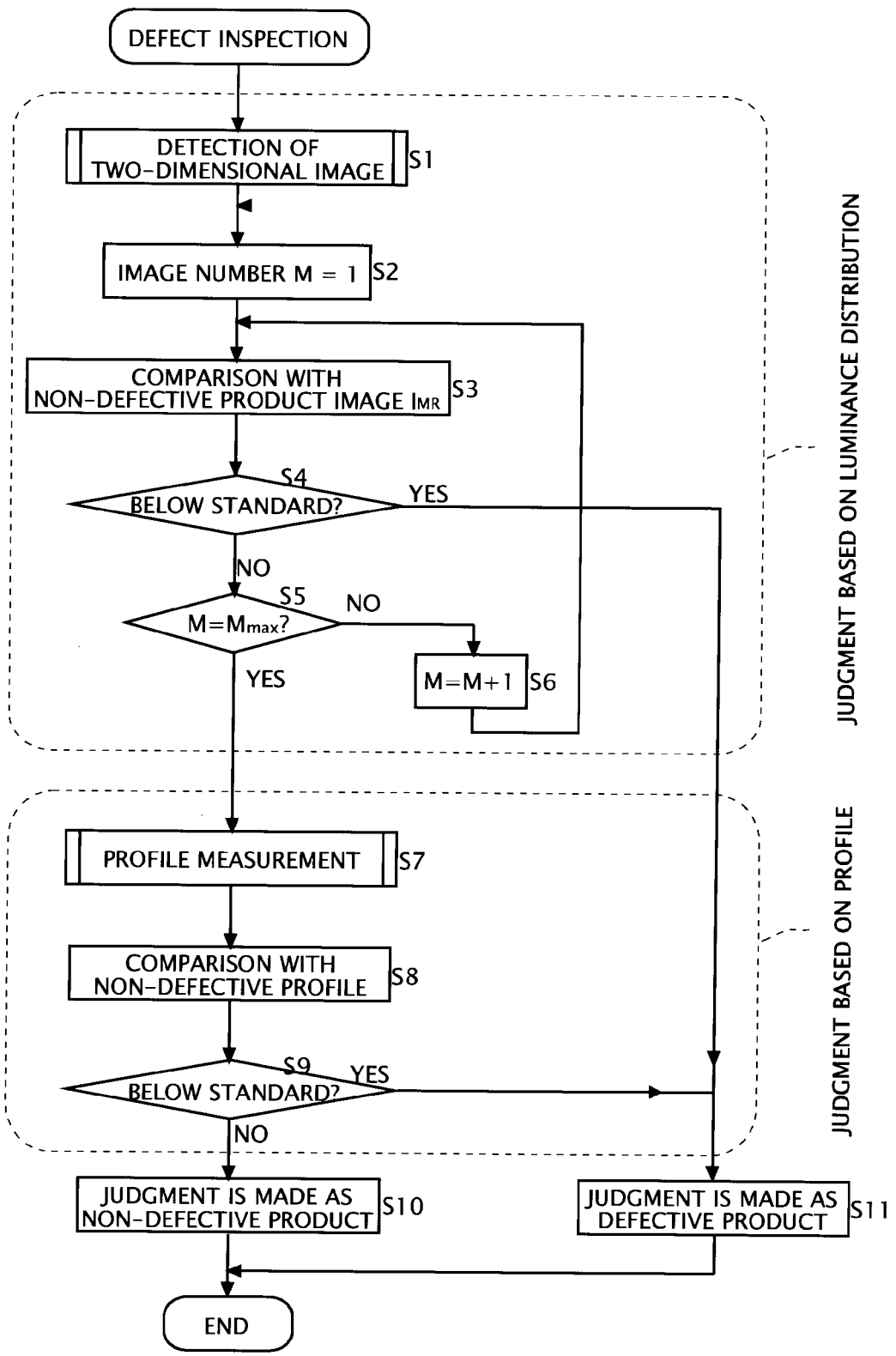
FIG. 5 is a flow chart of defect inspecting processing performed by a CPU 15 of the first embodiment.

FIG. 5 is a flow chart of the defect inspecting processing performed by the CPU 15. Hereinafter, respective steps in FIG. 5 will be described in order.

Step S1: The CPU 15 executes light intensity distribution measuring processing illustrated in FIG. 6 to obtain a plurality of two-dimensional images $I_1$ to $I_8$ with mutually different illuminating directions, and stores the images in the storage part 16. Note that details of FIG. 6 will be described later.

Step S2: The CPU 15 sets an image number M to an initial value (1).

Step S3: The CPU 15 reads the M-th two-dimensional image $I_M$ and the M-th non-defective product image $I_{MR}$ from the storage part 16, and calculates an evaluating value indicating a correlation degree of these two images (refer to FIGS. 8A to 8D).

Note that when calculating the evaluating value, the CPU 15 performs preprocessing (rotation processing, shift processing or the like, for example) on at least one of the two-dimensional image $I_M$ and the non-defective product image $I_{MR}$, thereby aligning an area of distribution of the two-dimensional image $I_M$ and an area of distribution of the non-defective product image $I_{MR}$.

Further, the calculation of the evaluating value may be conducted for each partial area of the two-dimensional image $I_M$ and the non-defective product image $I_{MR}$, or may also be conducted with respect to the whole area, but, in this case, the calculation is set to be conducted with respect to the whole area, for the sake of simplification.

Step S4: The CPU 15 compares the evaluating value calculated in step S3 with a threshold value, in which when the evaluating value is less than the threshold value, the CPU 15 immediately judges that the object 11 is below standard, and the process proceeds to step S11, and when the evaluating value is equal to or greater than the threshold value, the CPU 15 judges that there remains a possibility that the object 11 is within standard, and the process proceeds to step S5.

Step S5: The CPU 15 judges whether or not the image number M reaches a final value $M_{max}$, in which when the number does not reach the value, the process proceeds to step S6, and when the number reaches the value, the process proceeds to step S7. Note that since the number of auxiliary light sources is set to "8" in this case, the final value $M_{max}$ also becomes "8".

Step S6: The CPU 15 increments the image number M, and the process returns to step S3. Therefore, the CPU 15 repeats the comparison between the two-dimensional image and the non-defective product image (calculation of evaluating value) as in FIGS. 8A, 8B, 8C, . . . until it judges that the object 11 is below standard, or the image number M reaches "8".

Step S7: The CPU 15 executes profile measuring processing illustrated in FIG. 7 to obtain profile data D of the object surface, and stores the data in the storage part 16. Note that details of FIG. 7 will be described later.

Step S8: The CPU 15 reads the profile data D and the non-defective profile data $D_R$ from the storage part 16, and calculates an evaluating value indicating a correlation degree of these two pieces of data (refer to FIG. 9).

Note that when calculating the evaluating value, the CPU 15 performs preprocessing (rotation processing, shift processing or the like, for example) on at least one of the profile data D and the non-defective profile data $D_R$, thereby aligning an area of distribution of the profile data D and an area of distribution of the non-defective profile data $D_R$.

Further, the calculation of evaluating value may be conducted for each part of the profile data D and the non-defective profile data $D_R$, or may also be conducted with respect to the entire data, but, in this case, the calculation is set to be conducted with respect to the entire data, for the sake of simplification.

Further, as the evaluating value, it is also possible to use, other than the evaluating value indicating the correlation degree, a value obtained by quantifying a depth or a volume of a defective portion determined from a difference between the profile data and the non-defective profile data, or the like.

Step S9: The CPU 15 compares the evaluating value calculated in step S8 with a threshold value, in which when the evaluating value is less than the threshold value, the CPU 15 judges that the object 11 is below standard, and the process proceeds to step S11, and when the evaluating value is equal to or greater than the threshold value, the CPU 15 judges that the object 11 is within standard, and the process proceeds to step S10. Note that it is set that the threshold value used in the present step is previously stored in the storage part 16.

Step S10: The CPU 15 displays an inspection result indicating that the object 11 is a non-defective product, on the monitor 17, and terminates the flow.

Step S11: The CPU 15 displays an inspection result indicating that the object 11 is a defective product, on the monitor 17, and terminates the flow.

As described above, the defect inspecting apparatus of the present embodiment measures both of the light intensity distribution of the object surface and the profile of the object surface, and makes judgment that the object 11 is the non-defective product only when both of the light intensity distribution and the profile are within standard, so that it has a high inspection accuracy compared to a case where only the light intensity distribution is measured, or only the profile is measured.

Besides, the defect inspecting apparatus of the present embodiment illuminates the object surface from the mutually different plural directions when measuring the light intensity distribution, so that it is possible to detect a defect regarding a texture of the object surface, without being influenced by the profile of the object surface. Further, since such illumination can emphasize the defect, it is possible to securely detect even a small defect (incidentally, when the illuminating direction is set to only one direction, there is generated a portion to be shaded on the object surface, resulting in that a defect regarding a texture of that portion may be failed to be noticed).

Further, since the defect inspecting apparatus of the present embodiment uses the image-forming optical system 25 and the imaging element 26 in common for the light intensity distribution measurement and the profile measurement, it is possible to achieve the improvement in inspection accuracy while suppressing an increase in the number of parts.

In the aforementioned embodiment, the stage 12 is disposed as the defect inspecting apparatus or the three-dimensional profile measuring apparatus, but, the apparatus can also be configured as a so-called portable apparatus so that the apparatus can be freely moved with respect to the measuring object. In this case, the stage 12 is not necessary, and it is only required to configure such that a chassis 30 illustrated in FIG. 1 is separated from a support member 31 to enable the free movement of the chassis 30.

In the aforementioned embodiment, the light sources with different wavelengths are used as the light source 21 and the light source 27, so that if a configuration in which the image can be obtained by separating the wavelengths is employed, it is possible to simultaneously conduct the obtainment of the two-dimensional image and the three-dimensional profile measurement. Further, it is also possible to make the wavelengths of the two light sources to be the same.

[Light Intensity Distribution Measuring Processing]

Figure 6:
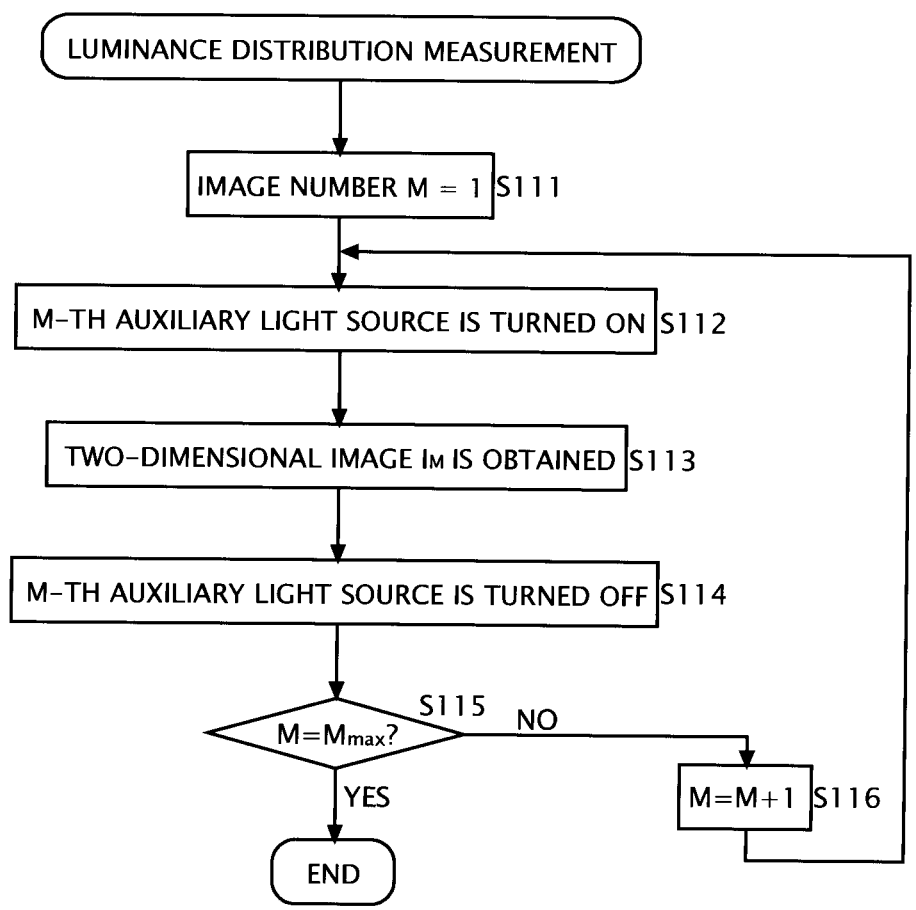
FIG. 6 is a flow chart of light intensity distribution measuring processing.

FIG. 6 is a flow chart of the light intensity distribution measuring processing performed by the CPU 15. Hereinafter, respective steps in FIG. 6 will be described in order.

Step S111: The CPU 15 sets an image number M to an initial value (1).

Step S112: The CPU 15 instructs the controlling part 101 to turn on the M-th auxiliary light source 27-M. The controlling part 101 turns on the M-th auxiliary light source 27-M, and keeps an off-state of the other auxiliary light sources and the main light source 21.

Step S113: The CPU 15 instructs the controlling part 101 to obtain an image. The controlling part 101 drives the imaging element 26 to obtain the two-dimensional image $I_M$ corresponding to one frame, and transmits the two-dimensional image $I_M$ to the CPU 15.

Step S114: The CPU 15 instructs the controlling part 101 to turn off the M-th auxiliary light source 27-M. The controlling part 101 turns off the M-th auxiliary light source 27-M, and keeps an off-state of the other auxiliary light sources and the main light source 21.

Step S115: The CPU 15 judges whether or not the image number M reaches a final value $M_{max}$ ("8", in this case), in which when the number does not reach the value, the process proceeds to step S116, and when the number reaches the value, the flow is terminated.

Step S116: The CPU 15 increments the image number M, and the process returns to step S112. Therefore, the CPU 15 repeats the obtainment of two-dimensional images $I_M$ eight times while switching the auxiliary light sources to be switched on, thereby obtaining eight pieces of two-dimensional images $I_1$ to $I_8$ with mutually different illuminating directions.

Note that in the above-described explanation, all of the plurality of light sources are set to independently provide illumination, but, it is also possible to conduct the inspection and the measurement by using only an arbitrary light source among the plurality of light sources. Further, it is also possible to make the plurality of light sources emit light at the same time. Because of the illumination from different directions, small flaws and holes are emphasized, so that it becomes possible to detect the flaws and holes more easily through the obtainment of two-dimensional image. It becomes possible to check the flaws and holes simultaneously with the performance of the profile measurement (three-dimensional profile measurement). In this case, the defect inspection does not always have to be conducted, and it is required to perform only the detection of flaws, holes and the like, in addition to the three-dimensional profile measurement (profile measurement).

[Profile Measuring Processing]

Figure 7:
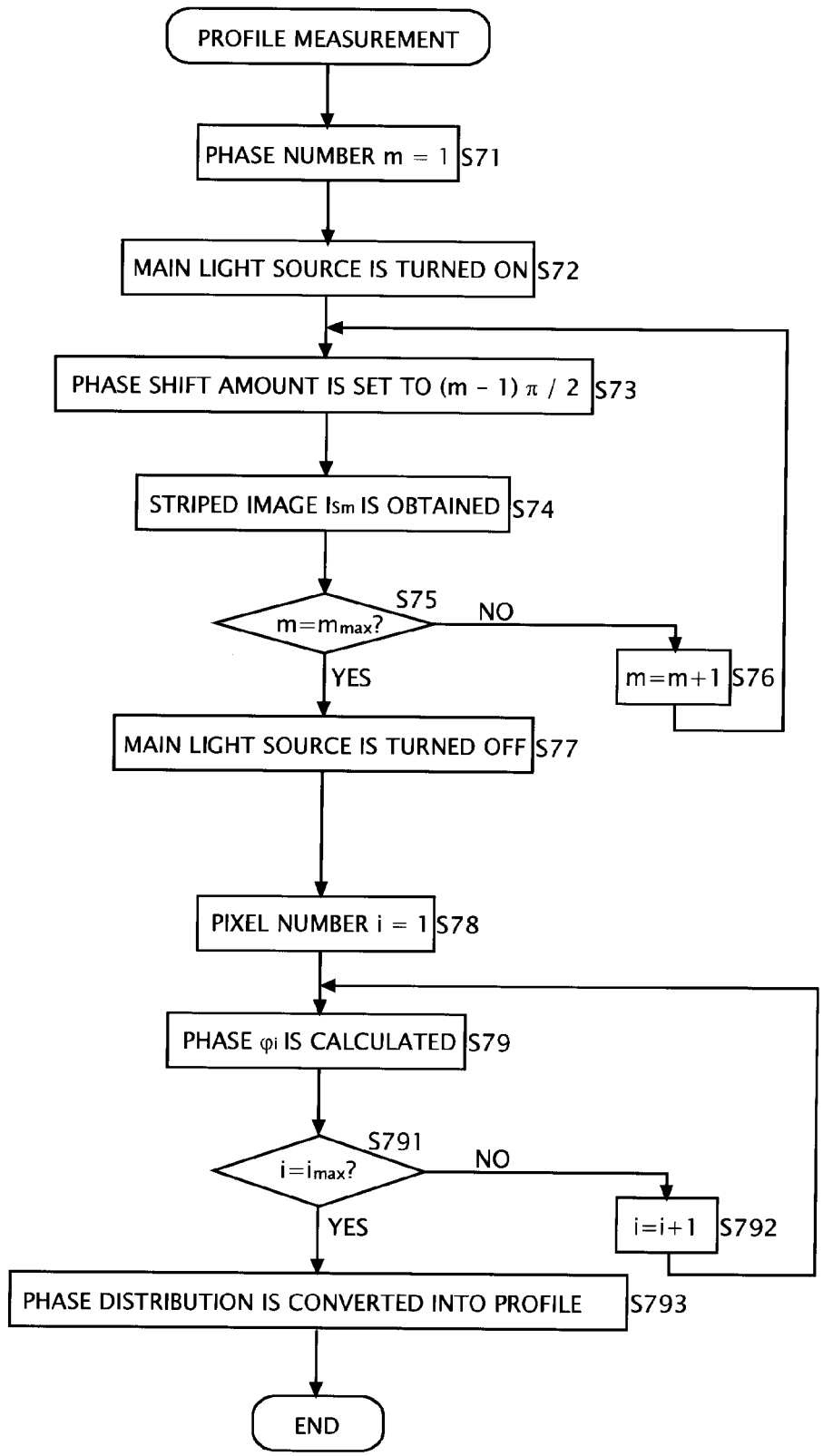
FIG. 7 is a flow chart of profile measuring processing.

FIG. 7 is a flow chart of the profile measuring processing performed by the CPU 15. Hereinafter, respective steps in FIG. 7 will be described in order.

Step S71: The CPU 15 sets a phase number m to an initial value (1).

Step S72: The CPU 15 instructs the controlling part 101 to turn on the main light source 21. The controlling part 101 turns on the main light source 21, and keeps an off-state of the auxiliary light sources 27-1 to 27-8.

Step S73: The CPU 15 instructs the controlling part 101 to set a phase of the sinusoidal profile pattern to a value represented by $(m-1)\pi/2$. The controlling part 101 sets the phase of the sinusoidal profile pattern displayed on the pattern forming part 23 to $(m-1)\pi/2$.

Step S74: The CPU 15 instructs the controlling part 101 to obtain an image. The controlling part 101 drives the imaging element 26 to obtain a striped image $I_{Sm}$ corresponding to one frame, and transmits the striped image $I_{Sm}$ to the CPU 15.

Step S75: The CPU 15 judges whether or not the phase number m reaches a final value $m_{max}$ (which is set to "4", in this case), in which when the number does not reach the value, the process proceeds to step S76, and when the number reaches the value, the process proceeds to step S77.

Step S76: The CPU 15 increments the phase number m, and the process returns to step S73. Therefore, the CPU 15 repeats the obtainment of striped images $I_{Sm}$ four times while shifting the phase of the sinusoidal profile pattern by $\pi/2$, thereby obtaining a plurality of striped images $I_{S1}$ to $I_{S4}$ with mutually different phases.

Step S77: The CPU 15 instructs the controlling part 101 to turn off the main light source 21. The controlling part 101 turns off the main light source 21, and keeps an off-state of the auxiliary light sources 27-1 to 27-8.

Step S78: The CPU 15 sets a pixel number i to an initial value (1), when analyzing the striped images $I_{S1}$ to $I_{S4}$.

Step S79: The CPU 15 refers to a series of pixel values $I_{S1i}$ to $I_{S4i}$ regarding i-th pixels in the striped images $I_{S1}$ to $I_{S4}$, and applies the values to the following expression, thereby calculating a value of initial phase $\phi_i$ of the i-th pixels.

$$\phi_i = \tan^{-1}\frac{I_{S4i} - I_{S2i}}{I_{S1i} - I_{S3i}} \qquad \text{[Mathematical expression 1]}$$

Step S791: The CPU 15 judges whether or not the pixel number i reaches a final value $i_{max}$, in which when the number does not reach the value, the process proceeds to step S792, and when the number reaches the value, the process proceeds to step S793. Note that the final value $i_{max}$ of the pixel number i indicates the number of pixels of the imaging element used for obtaining the striped image, and is represented by $i_{max}=200\times200=40000$, for example.

Step S792: The CPU 15 increments the pixel number i, and the process returns to step S79. Therefore, the CPU 15 calculates each value of the initial phase $\phi_i$ with respect to all pixel numbers i (i=1 to 40000).

Step S793: The CPU 15 arranges the values of initial phase $\phi_i$ calculated in the above-described step, in the order of pixel numbers, to obtain a phase distribution, and applies unwrapping processing (which is phase unwrapping processing of adding an offset distribution) to the phase distribution. Note that the offset distribution used in the unwrapping processing is determined by the design data of the defect inspecting apparatus, and is a value previously stored in the storage part 16. After that, the CPU 15 converts the phase distribution after being subjected to the unwrapping processing into height distribution data (profile data D) of the object surface.

In the above-described explanation, a method called as a phase shift method is used as the pattern projection method, in which the number of obtainment of striped images is not limited to 4, it is possible to conduct the profile measurement using the striped images whose number is larger (or smaller) than 4, such as 5, 7, 9, 11 or the like, and it is possible to appropriately use a well-known method.

[Supplements to the First Embodiment]

Note that the defect inspecting apparatus of the first embodiment performs the judgment based on the light intensity distribution (steps S1 to S6) first, and after that, it performs the judgment based on the profile (steps S7 to S9), but, it is also possible to reverse the order of the judgment.

Further, although it is set that the defect inspecting apparatus of the first embodiment performs the judgment based on the light intensity distribution (steps S1 to S6) and the judgment based on the profile (steps S7 to S9) in sequence, and when the result of the former judgment becomes "below standard", the apparatus immediately regards that the object 11 is the defective product without performing the latter judgment, it is also possible to make modification as follows.

Specifically, it is also possible to design such that the defect inspecting apparatus of the first embodiment calculates both of the evaluating value based on the light intensity distribution and the evaluating value based on the profile, and then performs non-defective/defective judgment (comprehensive judgment) of the object 11 based on both of those evaluating values. Note that the comprehensive judgment can be performed by, for example, comparing a weighting average value of a plurality of evaluating values with a previously prepared threshold value, or the like.

[Second Embodiment]

Hereinafter, a defect inspecting apparatus will be described as a second embodiment of the present invention. The defect inspecting apparatus of the present embodiment is also used for the defect inspection of the industrial product or the industrial part, similar to the defect inspecting apparatus of the first embodiment, and is particularly effective when the size of the object 11 is large. Here, only a point of difference from the defect inspecting apparatus of the first embodiment will be described.

Figure 10:
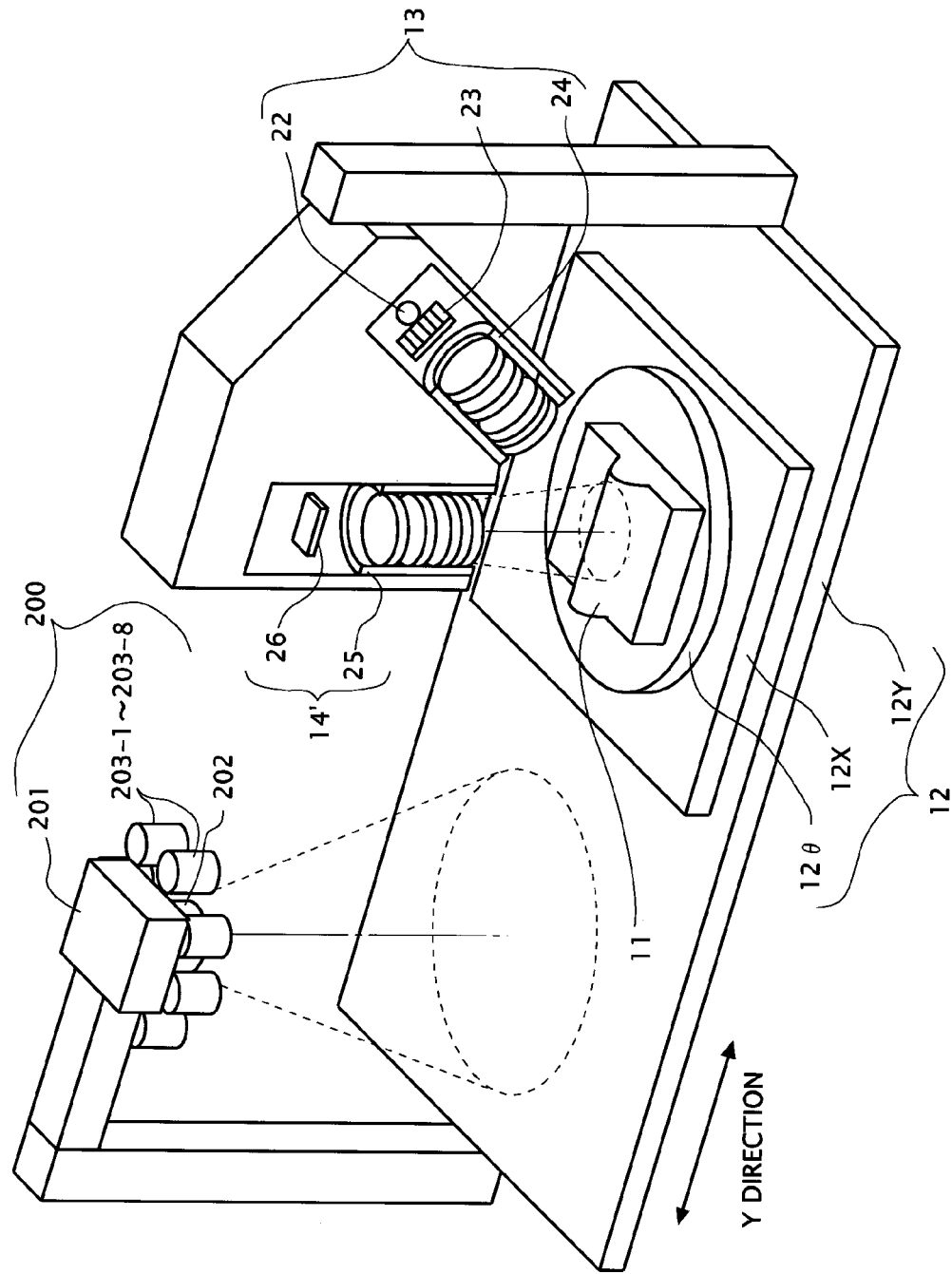
FIG. 10 is a perspective view illustrating a mechanical configuration of a defect inspecting apparatus of a second embodiment.
Figure 11:
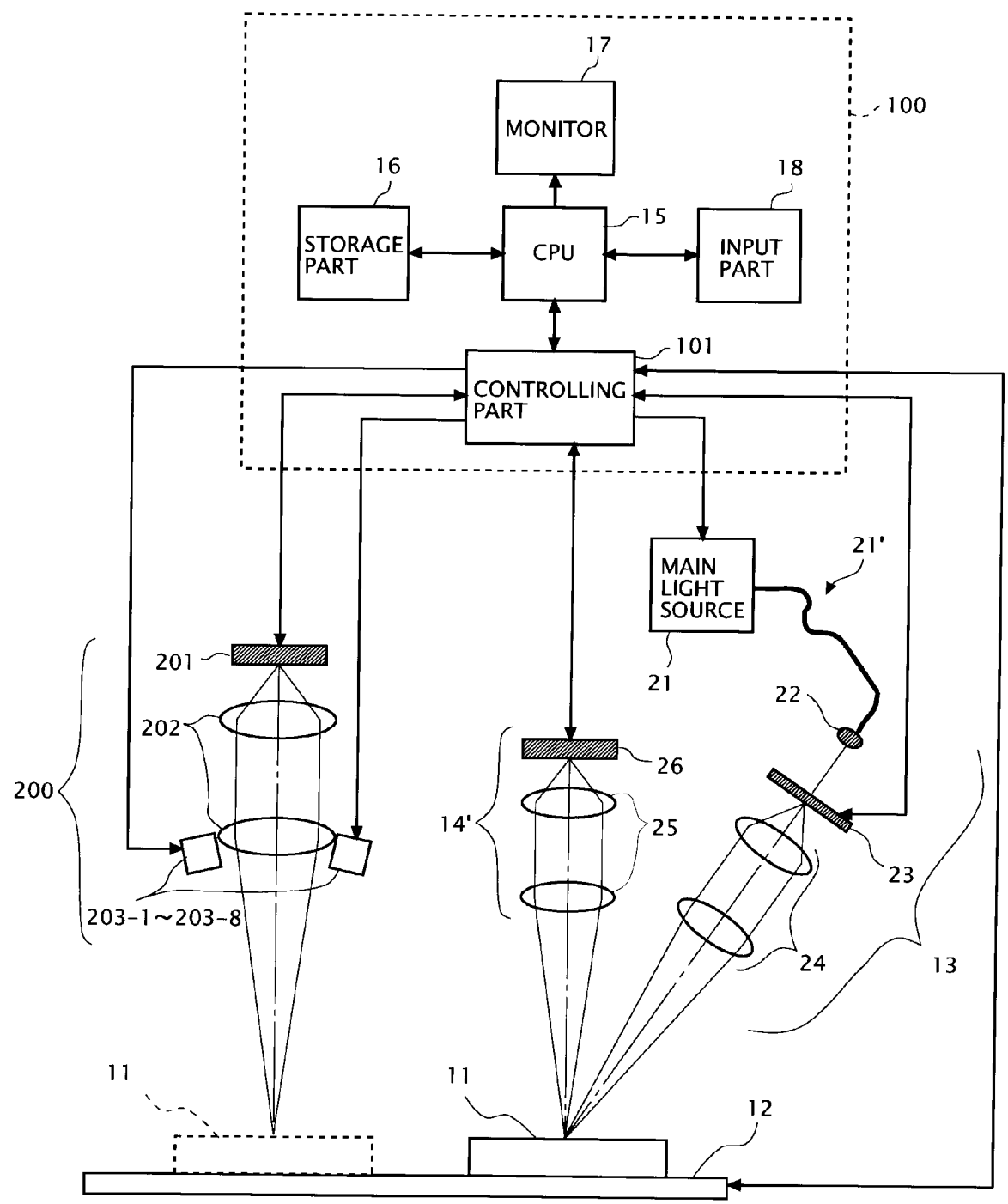
FIG. 11 is an entire configuration diagram of the defect inspecting apparatus of the second embodiment.

FIG. 10 is a perspective view illustrating a mechanical configuration of the defect inspecting apparatus of the present embodiment, and FIG. 11 is an entire configuration diagram of the defect inspecting apparatus of the present embodiment. In FIG. 10, the same elements as those of FIG. 1 are denoted by the same reference numerals, and in FIG. 11, the same elements as those of FIG. 2 are denoted by the same reference numerals.

As illustrated in FIG. 10 and FIG. 11, an imaging part 14' of the defect inspecting apparatus of the present embodiment does not include auxiliary light sources, and, instead of that, an imaging part 200 dedicated to the detection of two-dimensional image is provided separately from the imaging part 14'. Accordingly, the projecting part 13 and the imaging part 14' serve as an optical system dedicated to the profile measurement.

A field of view of the imaging part 200 (which is an area on the stage 12 capable of being detected by the imaging part 200) is larger than a field of view of the imaging part 14' (which is an area on the stage 12 capable of being detected by the imaging part 14'), and even the whole object 11 with a size which is too large to be fitted in the field of view of the imaging part 14', can be captured by the field of view of the imaging part 200.

An optical axis of the imaging part 200 is parallel to an optical axis of the imaging part 14', and is set to a position separated from the optical axis of the imaging part 14' by a predetermined distance. The predetermined distance is set large enough so that the field of view of the imaging part 14' (area on the stage 12 from which the striped image can be formed) is separated from the field of view of the imaging part 200 (area on the stage 12 from which the two-dimensional image can be formed).

Note that in FIG. 10 and FIG. 11, it is supposed that the optical axis of the imaging part 200 exists on the same plane as that on which the optical axis of the imaging part 14' and the optical axis of the projecting part 13 exist, and a direction from the optical axis of the imaging part 14' toward the optical axis of the imaging part 200 is supposed to be "Y direction".

Note that in this case, when switching the measurement methods between the profile measurement and the light intensity distribution measurement, the defect inspecting apparatus of the present embodiment is only required to drive the Y stage 12Y to move the object 11 to the Y direction by an amount of deviation between the optical axes described above. Accordingly, it is set that the storage part 16 of the present embodiment previously stores information regarding a stage movement amount (stage offset) required for switching the measurement methods.

Meanwhile, in the imaging part 200, an image-forming optical system 202 that forms an image of reflected light generated at the stage 12, and an imaging element 201 that captures an image formed by the image-forming optical system 202 to obtain an image, are disposed in sequence.

Out of the above, the imaging element 201 has an imaging plane which is optically conjugated to the reference plane of the stage 12. Accordingly, the imaging element 201 can obtain an image of object surface of the object 11 disposed in the vicinity of the optical axis of the imaging part 200, out of the stage 12.

Further, there are provided auxiliary light sources 203-1 to 203-8 around a lens on the stage 12 side of the image-forming optical system 202, and these auxiliary light sources 203-1 to 203-8 can illuminate a field of view of the image-forming optical system 202 from mutually different directions.

Note that a function of the auxiliary light sources 203-1 to 203-8 with respect to the image-forming optical system 202 in the present embodiment is the same as the function of the auxiliary light sources 27-1 to 27-8 with respect to the image-forming optical system 25 in the first embodiment, and modified examples of the auxiliary light sources in the present embodiment are also similar to those in the first embodiment, so that explanation will be omitted here.

However, a diameter of the image-forming optical system 202 to which the auxiliary light sources 203-1 to 203-8 in the present embodiment are provided is larger than a diameter of the image-forming optical system 25 to which the auxiliary light sources 27-1 to 27-8 in the first embodiment are provided, so that a size of each of the auxiliary light sources 203-1 to 203-8 in the present embodiment is desirable to be larger than a size of each of the auxiliary light sources 27-1 to 27-8 in the first embodiment.

Note that it is also possible that, instead of increasing the size of each of the auxiliary light sources in the present embodiment, the number of auxiliary light sources in the present embodiment is set to be larger than the number of auxiliary light sources in the first embodiment. However, in the description hereinbelow, it is assumed that the number of auxiliary light sources in the present embodiment is the same as the number of auxiliary light sources in the first embodiment, for the sake of simplification.

Further, the imaging element 201 of the imaging part 200 is only required to have at least sensitivity with respect to emission wavelengths of the auxiliary light sources 203-1 to 203-8. Meanwhile, the imaging element 26 of the imaging part 14' is only required to have at least sensitivity with respect to an emission wavelength of the light source (main light source 21) of the projecting part 13.

Figure 12:
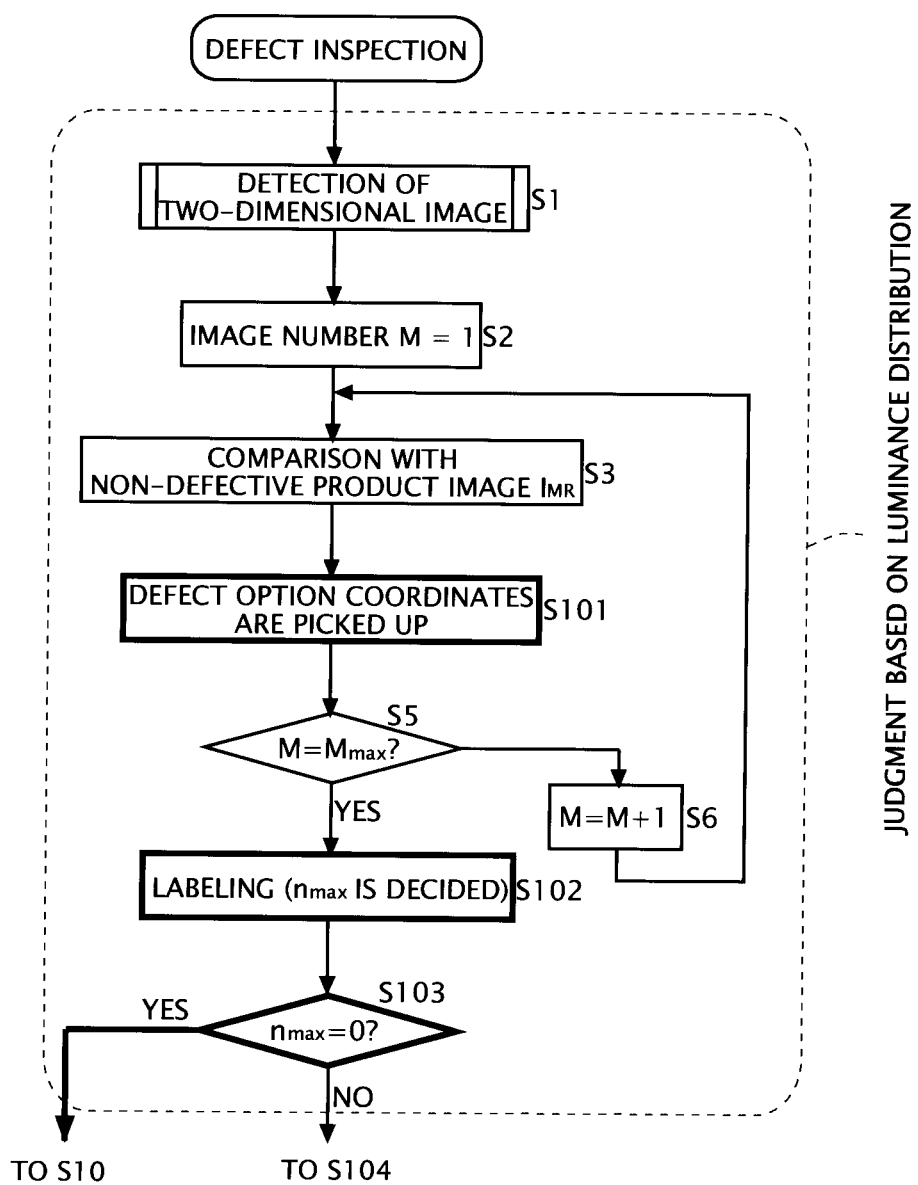
FIG. 12 is a flow chart (first half) of defect inspecting processing performed by a CPU 15 of the second embodiment.
Figure 13:
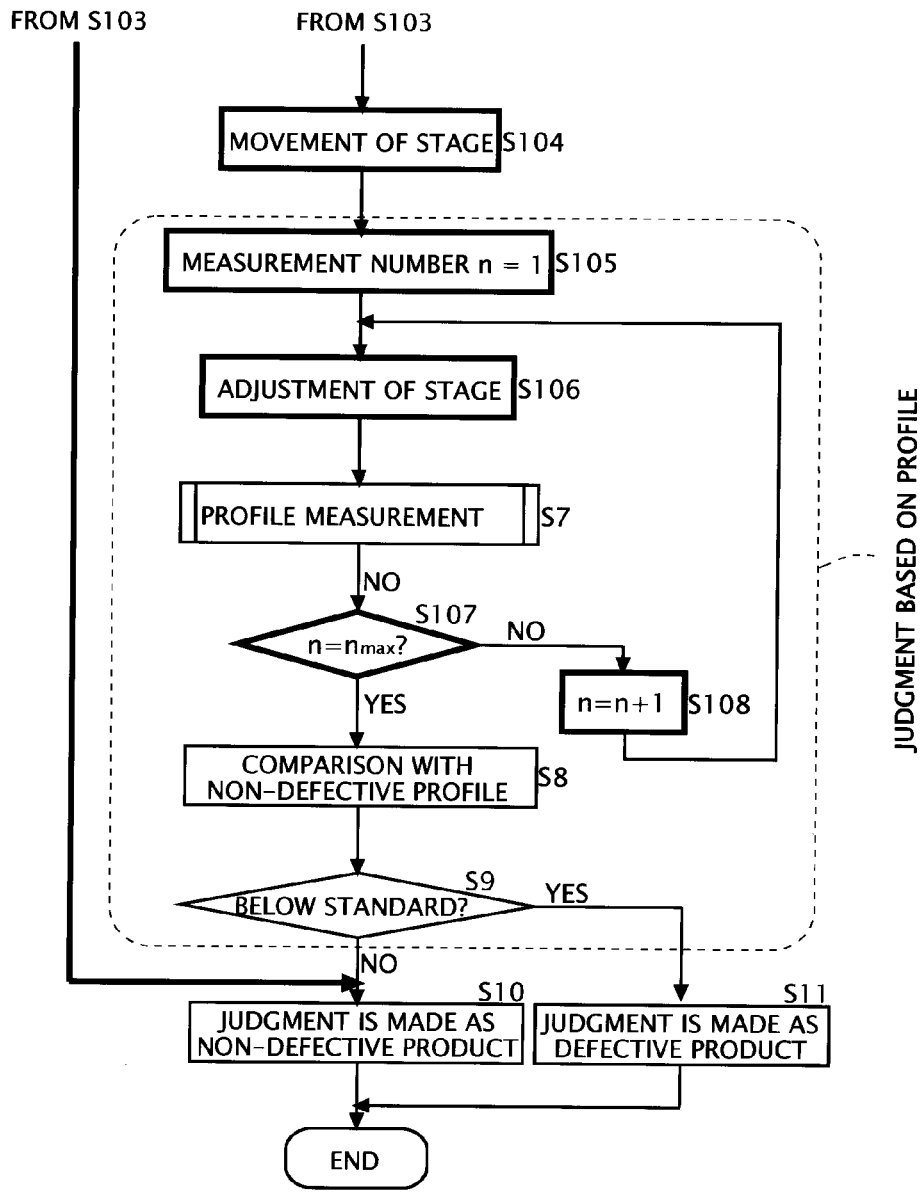
FIG. 13 is a flow chart (latter half) of the defect inspecting processing performed by the CPU 15 of the second embodiment.

FIG. 12 and FIG. 13 are flow charts of defect inspecting processing performed by the CPU 15 of the present embodiment. Hereinafter, respective steps in FIG. 12 and FIG. 13 will be described in order. Note that at a time point at which the defect inspecting processing is started, it is set that the stage 12 is stopped at a position at which the object 11 is fitted within the field of view of the imaging part 200.

Step S1: The CPU 15 executes light intensity distribution measuring processing illustrated in FIG. 6 to obtain a plurality of two-dimensional images $I_1$ to $I_8$ with mutually different illuminating directions, and stores the images in the storage part 16. Note that in the light intensity distribution measuring processing of the present embodiment, the imaging element 201 is driven, instead of driving the imaging element 26, and the auxiliary light sources 203-1 to 203-8 are driven, instead of driving the auxiliary light sources 27-1 to 27-8.

Step S2: The CPU 15 sets an image number M to an initial value (1).

Step S3: The CPU 15 reads the M-th two-dimensional image $I_M$ and the M-th non-defective product image $I_{MR}$ from the storage part 16, and performs preprocessing (rotation processing, shift processing or the like, for example) on at least one of the two-dimensional image $I_M$ and the non-defective product image $I_{MR}$, thereby aligning an area of distribution of the two-dimensional image $I_M$ and an area of distribution of the non-defective product image $I_{MR}$.

Figure 14:
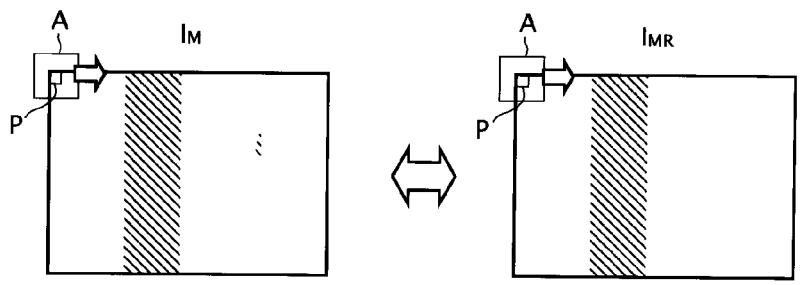
FIG. 14 is a diagram explaining step S3 in the second embodiment.

Subsequently, the CPU 15 sets a target pixel P on each of the processed two-dimensional image $I_M$ and non-defective product image $I_{MR}$ as illustrated in FIG. 14, sets each local area A (square area of several pixels×several pixels, for instance) in which the target pixel P is set as a center, and calculates a correlation degree between the local area A in the two-dimensional image $I_M$ and the same area A in the non-defective product image $I_{MR}$, as an evaluating value regarding the target pixel P of the two-dimensional image $I_M$.

Further, the CPU 15 repeatedly calculates the evaluating value as above while shifting the position of the target pixel P on the two-dimensional image $I_M$, to thereby calculate the evaluating value for each pixel of the two-dimensional image $I_M$.

Figure 15A:
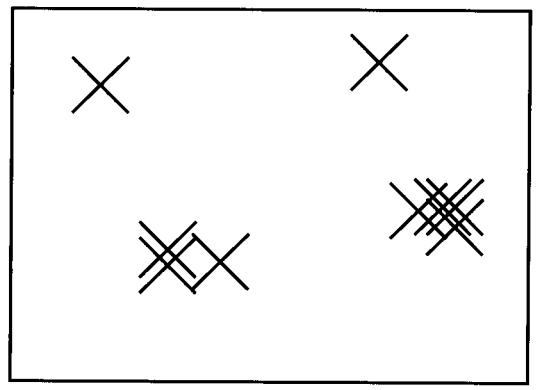
FIGS. 15A, 15B, and 15C are diagrams explaining steps S101 and S102.

Step S101: The CPU 15 compares the evaluating value of each pixel calculated in step S3 with each threshold value, and picks up coordinates of pixel (pixel coordinates) whose evaluating value is less than the threshold value, as defect option coordinates (refer to FIG. 15A).

Step S5: The CPU 15 judges whether or not the image number M reaches a final value $M_{max}$, in which when the number does not reach the value, the process proceeds to step S6, and when the number reaches the value, the process proceeds to step S102.

Step S6: The CPU 15 increments the image number M, and the process returns to step S3. Therefore, the CPU 15 repeats the pick-up of the defect option coordinates (step S3) until the image number M reaches "8". Accordingly, the defect option coordinates are accumulated.

Figure 15B:
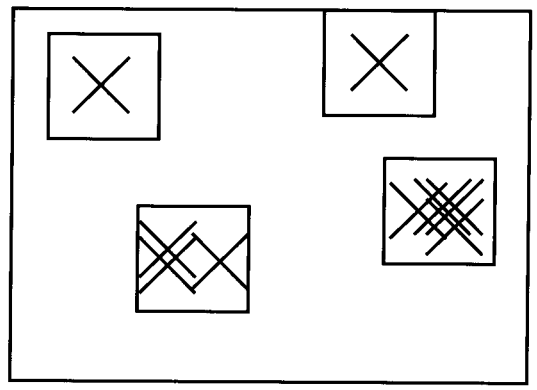

Step S102: The CPU 15 refers to all of the defect option coordinates picked up in the above-described step, determines a minimum number of rectangular frames required for surrounding all of those defect option coordinates on a coordinate space, and sets the number to a final value $n_{max}$ of measurement number n (refer to FIG. 15B). Note that a size of the rectangular frame supposed in the present step is set to the same size as a size of projected image obtained when the image-forming optical system 202 projects, on the imaging element 201, an object with the same size as that of the field of view of the imaging part 14'.

Figure 15C:
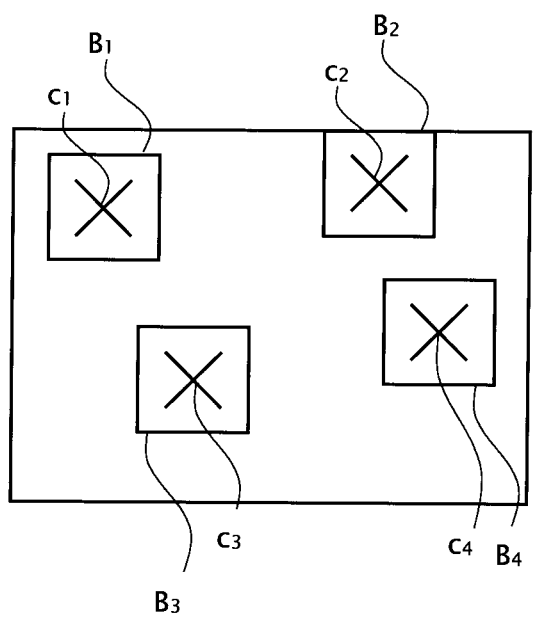

Further, the measurement numbers n=1 to $n_{max}$ are labeled, by the CPU 15, with respect to one or a plurality of rectangular frames required for surrounding all of those defect option coordinates (refer to FIG. 15C), and the CPU 15 determines center coordinates of respective $n_{max}$ pieces of rectangular frames $B_1$ to $B_{nmax}$, as measured coordinates $c_n$ to $c_{nmax}$, and stores the coordinates in the storage part 16.

Step S103: The CPU 15 judges whether or not a value of the final value $n_{max}$ determined in step S102 is zero, in which when the value is zero, the CPU 15 immediately judges that there is no possibility that the object 11 is below standard, and the process proceeds to step S10, and when the value is not zero, the CPU 15 judges that there is a possibility that the object 11 is below standard, and the process proceeds to step S104.

Step S104: The CPU 15 reads, in order to switch the measurement methods, the information regarding the stage offset from the storage part 16, and gives, to the controlling part 101, an instruction of moving the stage, together with the stage offset. Under the instruction of the controlling part 101, the stage 12 makes the object 11 shift by the stage offset, thereby making a part, out of the object 11, which was positioned on the optical axis of the imaging part 200, to be positioned on the optical axis of the imaging part 14'. Hereinafter, the stage 12 is set to be driven by setting stage coordinates under this state as a reference (origin).

Step S105: The CPU 15 sets the measurement number n to an initial value (1).

Step S106: The CPU 15 reads the n-th measured coordinates $c_n$ from the storage part 16, and calculates target values of the stage coordinates required for disposing a part, out of the object surface, corresponding to the measured coordinates $c_n$, on the optical axis of the imaging part 14' (this calculation is conducted based on the measured coordinates $c_n$ and the design data of the defect inspecting apparatus). Subsequently, the CPU 15 gives, to the controlling part 101, an instruction of moving the stage, together with the calculated target values. Under the instruction of the controlling part 101, the stage 12 makes the object 11 shift so that the stage coordinates become the target values.

Step S7: The CPU 15 executes profile measuring processing illustrated in FIG. 7 to obtain profile data D regarding a part, out of the object surface, captured by the field of view of the imaging part 14', and stores the data in the storage part 16.

The profile data D is profile data regarding a part, out of the object surface, corresponding to the measured coordinates $c_n$. The data is referred to as "partial profile data $D_n$", hereinafter.

Step S107: The CPU 15 judges whether or not the measurement number n reaches the final value $n_{max}$, in which when the number does not reach the value, the process proceeds to step S108, and when the number reaches the value, the process proceeds to step S8.

Step S108: The CPU 15 increments the measurement number n, and the process returns to step S106. Therefore, the CPU 15 obtains one piece or a plurality of pieces of partial profile data $D_1$ to $D_n$ regarding the object surface.

Step S8: The CPU 15 reads the partial profile data $D_1$ to $D_n$ and the non-defective profile data $D_R$ from the storage part 16, and arranges the partial profile data $D_1$ to $D_n$ based on a positional relation of the measured coordinates $c_1$ to $c_n$, thereby forming entire profile data D of the object 11. However, the profile data D may have a missing portion. Subsequently, the CPU 15 performs preprocessing (rotation processing, shift processing, enlargement/reduction processing or the like, for example) on at least one of the formed profile data D and the non-defective profile data $D_R$, thereby aligning an area of distribution of the profile data D and an area of distribution of the non-defective profile data $D_R$.

Further, the CPU 15 calculates an evaluating value indicating a correlation degree between data, out of the non-defective profile data $D_R$, indicating a profile of the part corresponding to the partial profile data $D_1$, and the partial profile data $D_1$. This evaluating value is an evaluating value of the partial profile data $D_1$. Further, the CPU 15 calculates the evaluating value as above with respect to each of the pieces of partial profile data $D_2$ to $D_n$, in a similar manner. Accordingly, the evaluating value of each of the pieces of partial profile data $D_1$ to $D_n$ is calculated.

Note that in the present step, the pieces of partial profile data $D_2$ to $D_n$ are joined together to form the profile data D, and then the evaluating value is calculated, but, it is also possible to design such that each of the pieces of partial profile data $D_2$ to $D_n$ and the corresponding part of the non-defective profile data $D_R$ are directly compared to calculate the evaluating value.

Further, in the present step, the evaluating value is calculated for each part (for each partial profile data) of the object surface, but, it is also possible to calculate the evaluating value for the entire profile data D. However, in the explanation hereinbelow, it is assumed that the evaluating value is calculated for each part (for each partial profile data) of the object surface.

Further, as the evaluating value, it is also possible to use, other than the evaluating value indicating the correlation degree, a value obtained by quantifying a depth or a volume of a defective portion determined from a difference between the profile data (or the partial profile data) and the non-defective profile data, or the like.

Step S9: The CPU 15 compares the evaluating value calculated in step S8 with each threshold value, in which when there exists the evaluating value which is less than the threshold value, the CPU 15 judges that the object 11 is below standard, and the process proceeds to step S11, and when there exists no evaluating value which is less than the threshold value, the CPU 15 judges that the object 11 is within standard, and the process proceeds to step S10.

Step S10: The CPU 15 displays an inspection result indicating that the object 11 is a non-defective product, on the monitor 17, and terminates the flow.

Step S11: The CPU 15 displays an inspection result indicating that the object 11 is a defective product, on the monitor 17, and terminates the flow.

As described above, the defect inspecting apparatus of the present embodiment sets the field of view in the light intensity distribution measurement to be larger than the field of view in the profile measurement, so that it is possible to set the resolution in the profile measurement to be higher than the resolution in the light intensity distribution measurement. Further, in the defect inspecting apparatus of the present embodiment, the part, out of the object 11, which was not regarded as the defect option in the tentative judgment based on the light intensity distribution, is excluded from the object of the profile measurement. Therefore, the judgment based on the profile measurement (specifically, judgment with comparatively high accuracy) is efficiently conducted.

Next, description will be made on a structure manufacturing system including the three-dimensional profile measuring apparatus, and the inspecting apparatus according to the first embodiment or the second embodiment.

Figure 16:
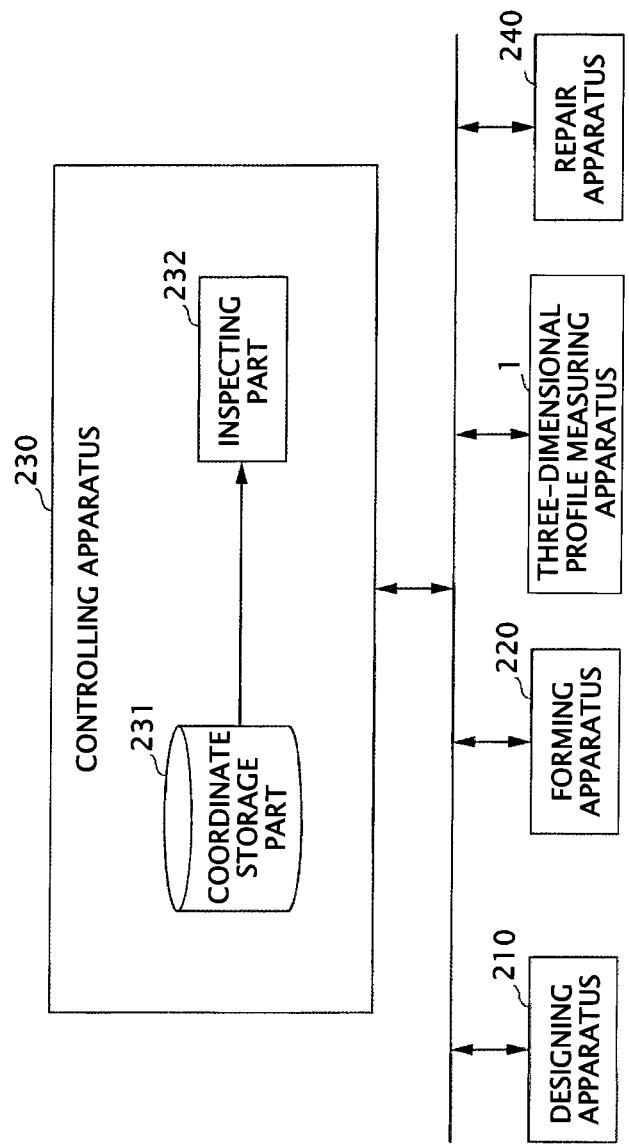
FIG. 16 is a block configuration diagram of a structure manufacturing system 200.

FIG. 16 is a block configuration diagram of a structure manufacturing system 200. The structure manufacturing system 200 is configured by including a three-dimensional profile measuring apparatus 1, a designing apparatus 210, a forming apparatus 220, a controlling apparatus 230, and a repair apparatus 240.

The designing apparatus 210 produces design information regarding a profile of structure, and transmits the produced design information to the forming apparatus 220. Further, the designing apparatus 210 makes a later-described coordinate storage part 231 of the controlling apparatus 230 store the formed design information. Here, the design information corresponds to information indicating coordinates of respective positions of the structure, for example.

The forming apparatus 220 manufactures the aforementioned structure, based on the design information input from the designing apparatus 210. A forming process of the forming apparatus 220 includes casting, forging, cutting or the like.

The three-dimensional profile measuring apparatus 1 measures coordinates (three-dimensional profile) of the aforementioned manufactured structure (measuring object 11), as described in the first embodiment, and transmits information indicating the measured coordinates (profile information) to the controlling apparatus 230.

The controlling apparatus 230 includes the coordinate storage part 231 and an inspecting part 232. In the coordinate storage part 231, the design information received from the designing apparatus 210 is stored, as described above. The inspecting part 232 reads the design information from the coordinate storage part 231, and compares the information indicating the coordinates (profile information) received from the three-dimensional profile measuring apparatus 1 and the design information read from the coordinate storage part 231.

Further, the inspecting part 232 judges, based on the comparison result, whether or not the structure is formed in accordance with the design information. In other words, the inspecting part 232 judges whether or not the formed structure is a non-defective product. Further, when the structure is not formed in accordance with the design information, the inspecting part 232 judges whether or not the repair can be made. When the repair can be made, the inspecting part 232 calculates a defective portion and a repair amount based on the comparison result, and transmits information indicating the defective portion and information indicating the repair amount, to the repair apparatus 240.

Further, when the apparatus of the present embodiment is used as the inspecting apparatus, it is also possible to conduct the non-defective/defective judgment by using only the defect inspection based on the two-dimensional image or by using the above-described inspection and the defect inspection in a combined manner.

The repair apparatus 240 performs processing on the defective portion of the structure, based on the information indicating the defective portion and the information indicating the repair amount received from the controlling apparatus 230.

Figure 17:
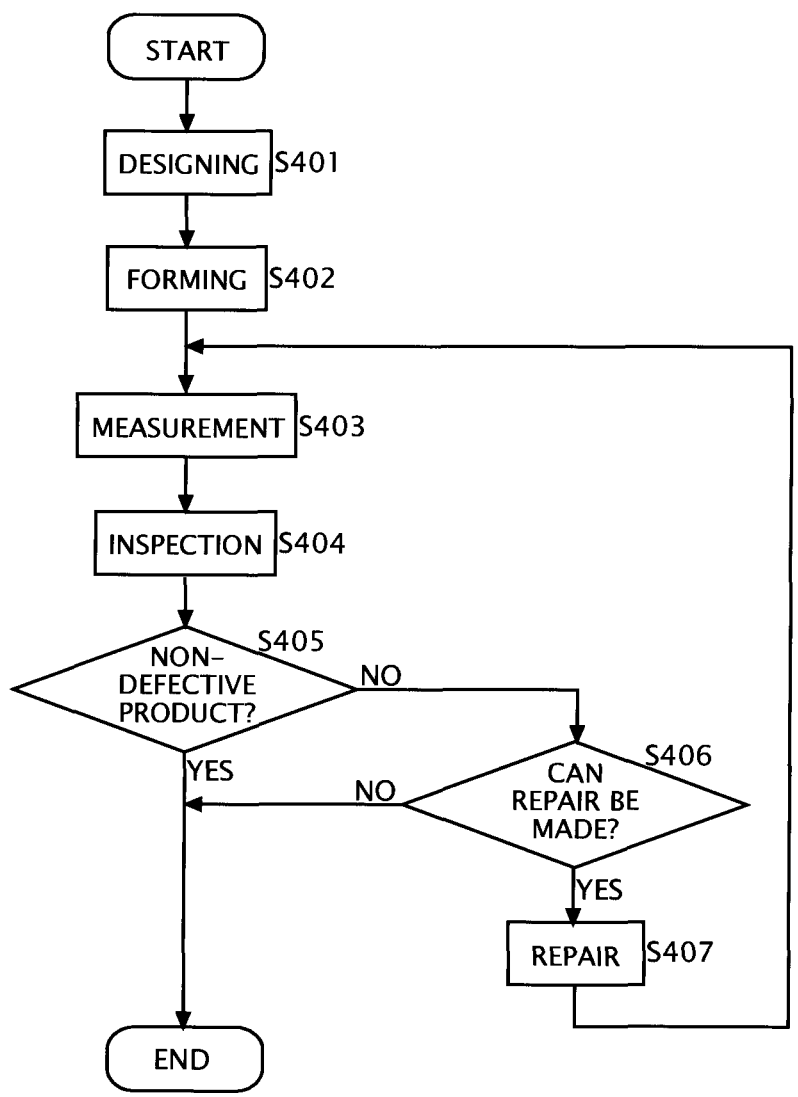
FIG. 17 is a flow chart illustrating a flow of processing performed by the structure manufacturing system 200.

FIG. 17 is a flow chart illustrating a flow of processing performed by the structure manufacturing system 200.

First, in step S401, the designing apparatus 210 produces the design information regarding the profile of the structure. Next, in step S402, the forming apparatus 220 manufactures the aforementioned structure based on the design information. Next, in step S403, the three-dimensional profile measuring apparatus 1 measures the profile of the above-described manufactured structure. Next, in step S404, the inspecting part 232 of the controlling apparatus 230 compares the profile information obtained by the three-dimensional profile measuring apparatus 1 and the aforementioned design information, to thereby inspect whether or not the structure is formed in accordance with the design information.

Next, in step S405, the inspecting part 232 of the controlling apparatus 230 judges whether or not the formed structure is a non-defective product. Further, when the formed structure is the non-defective product, the structure manufacturing system 200 terminates its processing. On the other hand, when the formed structure is not the non-defective product, the process proceeds to step S406.

Note that when the judgment is made only by the non-defective/defective judgment of defect based on the two-dimensional image described above, the process is terminated after step S405.

In step S406, the inspecting part 232 of the controlling apparatus 230 judges whether or not the formed structure can be repaired. When the formed structure can be repaired, the process proceeds to step S407, and when the formed structure cannot be repaired, the structure manufacturing system 200 terminates its processing. In step S407, the repair apparatus 240 performs reprocessing of the structure, and the process returns to the processing in step S403.

Through the processing described above, the structure manufacturing system 200 can judge whether or not the formed structure is the non-defective product. Further, when the structure is not the non-defective product, the structure manufacturing system 200 can repair the structure by performing the reprocessing of the structure.

Note that the repair process executed by the repair apparatus 240 in the present embodiment can also be replaced with a process in which the forming apparatus 220 re-executes the forming process. At that time, when the inspecting part 232 of the controlling apparatus 230 judges that the repair can be made, the forming apparatus 220 re-executes the forming process (forging, cutting or the like). Concretely, for example, the forming apparatus 220 performs cutting on a portion, in the structure, which should be originally cut but is not. Accordingly, the structure manufacturing system 200 can accurately form the structure.

Further, it is also possible to perform the three-dimensional profile measuring processing by recording a program for realizing the respective steps described in the aforementioned profile measuring processing in a computer-readable recording medium, making a computer system read the program recorded in the recording medium, and executing the program. Note that the "computer system" mentioned here may be one which includes hardware such as OS and peripheral devices.

Further, it is set that the "computer system" includes a homepage providing environment (or display environment) when it uses a WWW system.

Further, the "computer readable recording medium" means a portable medium such as a flexible disk, a magneto-optical disk, a ROM, a writable nonvolatile memory such as a flash memory, and a CD-ROM, and a storage device such as a hard disk built in a computer system.

Further, it is set that the "computer readable storage medium" includes one which keeps a program for a fixed time, such as a volatile memory (DRAM (Dynamic Random Access Memory), for example) inside computer systems which become a server and a client when the program is transmitted via a network such as the Internet, and a communication line such as a telephone line.

Further, the above-described program may be transmitted to another computer system via a transmission medium or by a transmission wave in the transmission medium from the computer system storing this program in the storage device and the like. Here, the "transmission medium" for transmitting the program indicates a medium having a function of transmitting information as a network (communication network) such as the Internet and a communication line (line of communication) such as a telephone line.

Further, the above-described program may be one for realizing a part of the aforementioned function. Further, the program may also be one which can realize the aforementioned function by the combination with the program already recorded in the computer system, which is, a so-called differential file (differential program).

Although one embodiment of this invention has been described above in detail with reference to the drawings, the concrete configuration is not limited to the above-described configuration, and various changes of design and the like can be made within a scope that does not depart from the gist of the invention.

[Supplements to the Respective Embodiments]

Note that the defect inspecting apparatus of any one of the embodiments described above obtains the plurality of two-dimensional images $I_1$ to $I_8$ with different illuminating directions as the light intensity distribution of the object surface, but, it may also obtain one piece of two-dimensional image $I_{all}$ in which the illuminating directions are set to all directions, instead of the two-dimensional images $I_1$ to $I_8$. This two-dimensional image $I_{all}$ corresponds to a two-dimensional image obtained in a state where all of the auxiliary light sources 27-1 to 27-8 are switched on at the same time. Note that in that case, the defect inspecting apparatus previously prepares a non-defective product image of the two-dimensional image $I_{all}$, and compares the non-defective product image and the two-dimensional image $I_{all}$, to thereby calculate an evaluating value regarding the two-dimensional image $I_{all}$.

Further, the defect inspecting apparatus of any one of the embodiments described above obtains the plurality of two-dimensional images $I_1$ to $I_8$ with different illuminating directions as the light intensity distribution of the object surface, but, it may also obtain one piece of two-dimensional image $I_{all}$ in which the illuminating directions are set to all directions, in addition to the two-dimensional images $I_1$ to $I_8$. Note that in that case, the defect inspecting apparatus calculates both of the evaluating values regarding the two-dimensional images $I_1$ to $I_8$, and an evaluating value regarding the two-dimensional image $I_{all}$.

Further, the defect inspecting apparatus of any one of the embodiments described above obtains the plurality of two-dimensional images $I_1$ to $I_8$ with different illuminating directions as the light intensity distribution of the object surface, but, it may also obtain a plurality of two-dimensional images each having a different combination of illuminating direction and illumination wavelength. Note that in that case, the defect inspecting apparatus is only required to prepare a plurality of non-defective product images each having a different combination of illuminating direction and illumination wavelength, as the plurality of non-defective product images.

Further, in the defect inspecting apparatus of any one of the embodiments described above, the number of auxiliary light sources (namely, the final value $M_{max}$ of the image number M) is set to 8, but, it may also be set to another number (4, 16, or the like).

Further, in the defect inspecting apparatus of any one of the embodiments described above, the pattern projection type is adopted as a type of the profile measurement, but, it is also possible to adopt another type such as, for example, any one of a probe method, a light-section method, and a moire method.

Further, although the defect inspecting apparatus of any one of the embodiments described above sets only one plane of the object 11 as the inspection object, it may also set a plurality of planes of the object 11 as the inspection objects.

Further, the defect inspecting apparatus of any one of the embodiments described above can adopt, when comparing the two-dimensional image with the non-defective product image, any one of publicly-known methods such as template matching, image profile comparison, and defect detection based on binarization processing.

Further, in the defect inspecting apparatus of any one of the embodiments described above, it is also possible to make the controlling part 101 execute a part of the operation of the CPU 15. Further, it is also possible to make the CPU 15 execute a part or all of the operation of the controlling part 101.

The many features and advantages of the embodiments are apparent from the detailed specification and, thus, it is intended by the appended claims to cover all such features and advantages of the embodiments that fall within the true spirit and scope thereof. Further, since numerous modifications and changes will readily occur to those skilled in the art, it is not desired to limit the inventive embodiments to the exact construction and operation illustrated and described, and accordingly all suitable modifications and equivalents may be resorted to, falling within the scope thereof.

What is claimed is:

1. An inspecting apparatus, comprising:
    a profile measuring part measuring a three-dimensional profile of an object surface;
    an image detecting part detecting a light intensity distribution of the object surface by illuminating the object surface from mutually different plurality of directions; and
    a controlling part conducting non-defective/defective judgment of the object surface by controlling the profile measuring part and the image detecting part.

2. The inspecting apparatus according to claim 1, wherein the controlling part is connected on the profile measuring part and the image detecting.

3. The inspecting apparatus according to claim 2 wherein the controlling part performs both of non-defective/defective judgment of the profile of the object surface using the profile measuring part and non-defective/defective judgment of the light intensity distribution of the object surface using the image detecting part, and performs comprehensive non-defective/defective judgment of the object surface based on results of those two types of non-defective/defective judgments.

4. The inspecting apparatus according to claim 3, wherein the controlling part detects a part with a predetermined light intensity distribution on the object surface using the image detecting part and excludes the part from a measuring region of the profile measuring part.

5. The inspecting apparatus according to claim 1, wherein:
the profile measuring part is a profile measuring apparatus which can measure the object surface by at least projecting a pattern; and
the image detecting part and the profile measuring part share at least a part of mutual optical systems.

6. The inspecting apparatus according to claim 1, wherein a field of view of the image detecting part is set larger than a field of view of the profile measuring part.

7. A three-dimensional profile measuring apparatus, comprising:
a profile measuring part measuring a three-dimensional profile of an object surface;
an image detecting part detecting a light intensity distribution of the object surface by illuminating the object surface from mutually different plurality of directions; and
a controlling part conducting non-defective/defective judgment of the object surface by controlling the profile measuring part and the image detecting part.

8. The three-dimensional profile measuring apparatus according to claim 7, wherein
the profile measuring part comprises a pattern projecting part projecting a pattern onto the object surface and a pattern image-forming part forming an image of the pattern projected onto the object surface on an imaging plane.

9. The three-dimensional profile measuring apparatus according to claim 7, wherein the controlling part controls the image detecting part to illuminate the object surface from the mutually different plurality of directions at a same time.

10. The three-dimensional profile measuring apparatus according to claim 7, wherein
the image detecting part comprises a plurality of light sources illuminating the object surface from the mutually different plurality of directions.

11. The three-dimensional profile measuring apparatus according to claim 7, wherein
the profile measuring part and the image detecting part are housed in one chassis.

12. The three-dimensional profile measuring apparatus according to claim 7, wherein the controlling part controls the image detecting part to illuminate the object surface from the mutually different directions at mutually different times.

13. The three-dimensional profile measuring apparatus according to claim 7, further comprising
a storage part storing a two-dimensional image formed at the light intensity distribution being detected by the image detecting part.

14. A manufacturing method of a structure, comprising:
a designing process producing design information regarding a profile of a structured object;
a forming process manufacturing the structured object based on the design information;
a measuring process calculating a three-dimensional profile of the structured object being manufactured using the three-dimensional profile measuring apparatus according to claim 7; and an inspecting process comparing profile information obtained in the measuring process and the design information.

15. The manufacturing method of the structure according to claim 14, further comprising
a repair process performing reprocessing of the structured object being executed based on a comparison result in the inspecting process.

16. The manufacturing method of the structure according to claim 15, wherein
the repair process is a process of re-executing the forming process.

17. The manufacturing method of the structure according to claim 15, wherein
the repair process is a process of performing processing on a defective portion of the structured object based on the comparison result in the inspecting process.

18. An inspecting apparatus comprising:
a profile measuring part measuring a three-dimensional profile of an object surface;
an image detecting part detecting a light intensity distribution of the object surface by illuminating the object surface; and
a controlling part setting a measuring part of the profile measuring part on the object surface based on the light intensity distribution being detected by the image detecting part.

19. The inspecting apparatus according to claim 18, wherein
the image detecting part comprises a plurality of light sources illuminating the object surface from mutually different plurality of directions.

20. The inspecting apparatus according to claim 18, wherein:
the profile measuring part is a pattern projection type profile measuring apparatus; and
an illumination intensity distribution of the object surface being illuminated by the image detecting part is different from an intensity distribution of pattern projected onto the object surface by the profile measuring part.

21. The inspecting apparatus according to claim 18, wherein
the controlling part detects a part with a predetermined light intensity distribution on the object surface using the image detecting part and excludes the part from the measuring object of the profile measuring part.

22. The inspecting apparatus according to claim 18, wherein
the controlling part conducts non-defective/defective judgment of the object surface based on a result of which the profile measuring part measure the object surface.

23. The inspecting apparatus according to claim 18, wherein:
the profile measuring part is a pattern projection type profile measuring apparatus which can measure the object surface by at least projecting a pattern; and
the image detecting part and the profile measuring part share at least a part of mutual optical systems.

24. The inspecting apparatus according to claim 18, wherein
a field of view of the image detecting part is larger than a field of view of the profile measuring part.

25. A three-dimensional profile measuring apparatus, comprising:
a profile measuring part measuring a three-dimensional profile of an object surface;

an image detecting part detecting a light intensity distribution of the object surface by illuminating the object surface; and a controlling part setting a measuring part of the profile measuring part on the object surface based on the light intensity distribution being detected by the image detecting part.

26. The three-dimensional profile measuring apparatus according to claim 25, wherein
the profile measuring part comprises a pattern projecting part projecting a pattern onto the object surface and a pattern image-forming part forming an image of the pattern projected onto the object surface on an imaging plane.

27. The three-dimensional profile measuring apparatus according to claim 25, wherein
the image detecting part comprises a plurality of light sources illuminating the object surface from mutually different plurality of directions.

28. The three-dimensional profile measuring apparatus according to claim 25, wherein:
the profile measuring part comprises a pattern projecting part projecting a pattern onto the object surface and a pattern image-forming part forming an image of the pattern projected onto the object surface on an imaging plane; and
an illumination intensity distribution of the object surface being illuminated by the image detecting part is different from an intensity distribution of the pattern.

29. The three-dimensional profile measuring apparatus according to claim 25, wherein:
the image detecting part comprises a plurality of light sources illuminating the object surface from mutually different plurality of directions; and
the controlling part controls the plurality of light sources to be switched on at a same time.

30. The three-dimensional profile measuring apparatus according to claims 25, wherein:
the image detecting part comprises a plurality of light sources illuminating the object surface from mutually different plurality of directions; and
the controlling part controls the plurality of light sources to be switched on at mutually different times.

31. The three-dimensional profile measuring apparatus according to claim 25, wherein
the profile measuring part and the image detecting part are housed in one chassis.

32. The three-dimensional profile measuring apparatus according to claim 25, further comprising
a storage part storing a two-dimensional image formed of the light intensity distribution being detected by the image detecting part.

33. A manufacturing method of a structure, comprising;
a designing process producing design information regarding a profile of a structured object;
a forming process manufacturing the structured object based on the design information;
a measuring process calculating a three-dimensional profile of the structured object being manufactured using the three-dimensional profile measuring apparatus according to claim 25; and
an inspecting process comparing profile information obtained in the measuring process and the design information.

34. The manufacturing method of the structure according to claim 33, further comprising
a repair process performing reprocessing of the structured object being executed based on a comparison result in the inspecting process.

35. The manufacturing method of the structure according to claim 34, wherein
the repair process is a process of re-executing the forming process.

36. The manufacturing method of the structure according to claim 34, wherein
the repair process is a process of performing processing on a defective portion of the structured object based on the comparison result in the inspecting process.

* * * * *